(12) United States Patent
Shany et al.

(10) Patent No.: US 11,136,737 B2
(45) Date of Patent: Oct. 5, 2021

(54) RAPID-DEPLOYMENT OIL SPILL CONTAINMENT BOOM AND METHOD OF DEPLOYMENT

(71) Applicant: HARBO Technologies Ltd., Tel-Aviv (IL)

(72) Inventors: Arnon Shany, Moshav Neve Yarak (IL); Boaz Ur, Tel-Aviv (IL); Haim Greenberg, Ramat-Gan (IL)

(73) Assignee: HARBO Technologies Ltd., Bnei-Brak (IL)

( * ) Notice: Subject to any disclaimer, the term of this patent is extended or adjusted under 35 U.S.C. 154(b) by 0 days.

(21) Appl. No.: 15/644,852

(22) Filed: Jul. 10, 2017

(65) Prior Publication Data

US 2017/0306580 A1    Oct. 26, 2017

Related U.S. Application Data

(63) Continuation of application No. 14/394,281, filed as application No. PCT/IL2013/050325 on Apr. 14, 2013, now Pat. No. 9,739,023.

(60) Provisional application No. 61/696,260, filed on Sep. 3, 2012, provisional application No. 61/624,353, filed on Apr. 15, 2012.

(51) Int. Cl.
*E02B 15/06* (2006.01)
*E02B 15/08* (2006.01)

(52) U.S. Cl.
CPC ............. *E02B 15/06* (2013.01); *E02B 15/08* (2013.01); *E02B 15/0807* (2013.01); *E02B 15/0878* (2013.01); *Y02A 20/204* (2018.01)

(58) Field of Classification Search
CPC ...... E02B 15/06; E02B 15/08; E02B 15/0807; E02B 15/0878; Y02A 20/204
USPC ....................................... 405/60–72
See application file for complete search history.

(56) References Cited

U.S. PATENT DOCUMENTS

| 2,853,006 | A |   | 9/1958  | Moir |
| 3,126,669 | A |   | 3/1964  | Gausewitz |
| 3,221,884 | A | * | 12/1965 | Muller ............ E02B 15/06 210/242.3 |
| 3,237,414 | A |   | 3/1966  | Straub et al. |

(Continued)

FOREIGN PATENT DOCUMENTS

| CA | 2036368 | 8/1991 |
| CN | 2350436 | 11/1999 |

(Continued)

OTHER PUBLICATIONS

Communication Pursuant to Article 94(3) EPC dated Oct. 6, 2017 From the European Patent Office Re. Application No. 13777827.0. (5 Pages).

(Continued)

*Primary Examiner* — Tara Mayo-Pinnock

(57) ABSTRACT

A rapid-deployment system for containing oil spills and similar water contaminations comprises a pre-manufactured sleeve having air-inflatable or gas-inflatable compartments and water inflatable compartments. In some embodiments uninflated sleeve is stored as a reel of sleeve material, and the deployment system, optionally mounted in a small boat, comprises a machine for inflating the air and water compartments at the site of a spill. In some embodiments, air and/or water compartments may be self-inflating.

29 Claims, 15 Drawing Sheets

(56) References Cited

U.S. PATENT DOCUMENTS

| | | | | |
|---|---|---|---|---|
| 3,248,939 | A | 5/1966 | Silverstein | |
| 3,321,923 | A * | 5/1967 | Smith | E02B 15/08 114/267 |
| 3,476,246 | A | 11/1969 | Dahan | |
| 3,499,290 | A | 3/1970 | Smith | |
| 3,499,291 | A | 3/1970 | Mikkelsen | |
| 3,503,512 | A * | 3/1970 | Desty et al. | E02B 15/06 210/242.3 |
| 3,563,036 | A | 2/1971 | Smith et al. | |
| 3,567,019 | A | 3/1971 | Headrick | |
| 3,581,899 | A * | 6/1971 | Hunter | E02B 15/041 210/242.4 |
| 3,592,008 | A | 7/1971 | Trindle | |
| 3,608,316 | A | 9/1971 | Manuel | |
| 3,613,377 | A | 10/1971 | Zaugg | |
| 3,638,429 | A | 2/1972 | Sladek et al. | |
| 3,650,406 | A | 3/1972 | Brown et al. | |
| 3,653,213 | A | 4/1972 | Childers | |
| 3,662,891 | A | 5/1972 | Headrick | |
| 3,664,504 | A | 5/1972 | Ayers et al. | |
| 3,708,982 | A | 1/1973 | Blockwick | |
| 3,744,253 | A | 7/1973 | Williams et al. | |
| 3,756,031 | A | 9/1973 | Smith et al. | |
| 3,798,911 | A | 3/1974 | Oberg | |
| 3,818,708 | A | 6/1974 | Benson | |
| 3,828,380 | A | 8/1974 | Lebovits et al. | |
| 3,844,122 | A | 11/1974 | Bliss, Jr. | |
| 3,845,633 | A | 11/1974 | Hammond | |
| 3,849,989 | A | 11/1974 | Preus | |
| 3,859,796 | A | 1/1975 | Benson | |
| 3,883,433 | A | 5/1975 | March et al. | |
| 3,901,753 | A | 8/1975 | Öberg | |
| 3,919,847 | A | 11/1975 | Ballu | |
| 3,922,860 | A | 12/1975 | Tanksley | |
| 3,922,862 | A | 12/1975 | Vidilles | |
| 3,935,690 | A | 2/1976 | Lea et al. | |
| 3,958,521 | A | 5/1976 | Memoli | |
| RE28,966 | E | 9/1976 | Blockwick | |
| 3,998,060 | A * | 12/1976 | Preus | E02B 15/06 405/70 |
| 4,030,304 | A | 6/1977 | West | |
| 4,065,923 | A | 1/1978 | Preus | |
| 4,068,478 | A | 1/1978 | Meyers et al. | |
| 4,123,911 | A | 11/1978 | Finigan et al. | |
| 4,124,981 | A | 11/1978 | Preus | |
| 4,174,186 | A | 11/1979 | Kasai et al. | |
| 4,188,155 | A | 2/1980 | Langermann | |
| 4,244,819 | A | 1/1981 | Ballu | |
| 4,260,285 | A | 4/1981 | Kurihara et al. | |
| 4,270,874 | A | 6/1981 | March et al. | |
| 4,295,755 | A | 10/1981 | Meyers | |
| 4,295,756 | A * | 10/1981 | Blair | E02B 15/08 24/453 |
| 4,319,858 | A | 3/1982 | Jaffrennou et al. | |
| 4,329,747 | A | 5/1982 | Russell | |
| 4,330,223 | A | 5/1982 | Webb | |
| 4,333,463 | A | 6/1982 | Holtman | |
| 4,487,151 | A | 12/1984 | Deiana | |
| 4,639,227 | A | 1/1987 | Rademakers | |
| 4,650,368 | A | 3/1987 | Bayer | |
| 4,652,173 | A | 3/1987 | Kallestad | |
| 4,711,067 | A | 12/1987 | Magni | |
| 4,749,600 | A | 6/1988 | Cullen et al. | |
| 4,781,493 | A | 11/1988 | Fischer | |
| 4,802,791 | A | 2/1989 | Fisher et al. | |
| 4,894,964 | A | 1/1990 | Thrift et al. | |
| 4,930,171 | A | 6/1990 | Frantz | |
| 4,964,758 | A | 10/1990 | Pekelny | |
| 4,998,845 | A | 3/1991 | Smith | |
| 5,020,940 | A | 6/1991 | Smith | |
| 5,040,918 | A | 8/1991 | Taricco | |
| 5,071,286 | A | 12/1991 | Separovich | |
| 5,074,709 | A | 12/1991 | Stensland | |
| 5,102,261 | A | 4/1992 | Gunderson, III | |
| 5,110,236 | A | 5/1992 | Santamaria | |
| 5,120,159 | A | 6/1992 | Smith | |
| 5,152,636 | A | 10/1992 | Myers | |
| 5,173,008 | A | 12/1992 | Thorell et al. | |
| 5,195,844 | A | 3/1993 | Goans | |
| 5,197,821 | A | 3/1993 | Cain et al. | |
| 5,201,607 | A | 4/1993 | Whidden, Jr. | |
| 5,238,327 | A | 8/1993 | Blair et al. | |
| 5,252,001 | A * | 10/1993 | Quinn | E02B 15/08 405/68 |
| 5,308,191 | A | 5/1994 | Goans | |
| 5,317,770 | A | 6/1994 | Sakurai | |
| 5,328,607 | A | 7/1994 | Soule | |
| 5,346,329 | A | 9/1994 | Goans et al. | |
| 5,362,180 | A | 11/1994 | Canning et al. | |
| 5,372,455 | A * | 12/1994 | Tarca | E02B 15/08 405/68 |
| 5,374,211 | A | 12/1994 | Imazato | |
| 5,376,345 | A | 12/1994 | Pfeffere | |
| 5,433,994 | A | 7/1995 | McKinney et al. | |
| 5,480,262 | A | 1/1996 | Russo, III | |
| 5,522,674 | A | 6/1996 | Cooper | |
| 5,547,313 | A | 8/1996 | Holland | |
| 5,580,185 | A | 12/1996 | Ware | |
| 5,695,300 | A | 12/1997 | Echols et al. | |
| 5,711,634 | A | 1/1998 | Oberg | |
| 5,860,252 | A | 1/1999 | Oeberg | |
| 5,885,451 | A | 3/1999 | Porrovecchio, Sr. | |
| 5,900,195 | A | 5/1999 | Pool et al. | |
| D427,323 | S | 6/2000 | Lihan et al. | |
| 6,073,382 | A | 6/2000 | Willener | |
| 6,085,628 | A | 7/2000 | Street et al. | |
| 6,095,840 | A | 8/2000 | Yamaguchi et al. | |
| 6,115,954 | A | 9/2000 | Willener et al. | |
| 6,293,217 | B1 * | 9/2001 | Savage et al. | B63B 35/285 114/256 |
| 6,767,162 | B2 | 7/2004 | Meyers et al. | |
| 6,797,857 | B2 | 9/2004 | Tanhehco | |
| 6,860,677 | B2 | 3/2005 | Johnston | |
| 6,942,422 | B2 | 9/2005 | Byrd et al. | |
| 7,090,432 | B2 | 8/2006 | Jackson | |
| 7,172,367 | B2 | 2/2007 | Jeory | |
| 7,497,643 | B2 | 3/2009 | Carnahan et al. | |
| 8,007,202 | B2 | 8/2011 | Davis et al. | |
| 8,398,334 | B1 | 3/2013 | Doyle | |
| 8,450,389 | B1 | 5/2013 | Barefoot | |
| 8,622,650 | B2 | 1/2014 | Lifton | |
| 8,721,220 | B2 | 5/2014 | Fore, III | |
| 8,821,363 | B1 | 9/2014 | Barefoot | |
| 9,206,575 | B2 | 12/2015 | Miller et al. | |
| 9,487,926 | B1 | 11/2016 | Miller et al. | |
| 9,808,726 | B2 | 4/2017 | Johnson | |
| 9,683,345 | B2 | 6/2017 | Joiner et al. | |
| 9,739,023 | B2 | 8/2017 | Shany et al. | |
| 9,809,942 | B2 | 11/2017 | Miller et al. | |
| 10,544,558 | B2 | 1/2020 | Shany et al. | |
| 2002/0018695 | A1 | 2/2002 | Johnson | |
| 2006/0099033 | A1 | 5/2006 | Boraggina | |
| 2007/0238373 | A1 | 10/2007 | Henrikson | |
| 2009/0000876 | A1 | 1/2009 | Ablabutyan et al. | |
| 2010/0150655 | A1 | 6/2010 | Kilvert | |
| 2010/0278591 | A1 | 11/2010 | Tasker | |
| 2011/0221199 | A1 * | 9/2011 | Boyce | F03B 13/20 290/53 |
| 2011/0280660 | A1 | 11/2011 | Bahukudumbi et al. | |
| 2011/0318109 | A1 | 12/2011 | Miller et al. | |
| 2012/0020732 | A1 | 1/2012 | Stiles et al. | |
| 2014/0076298 | A1 | 3/2014 | Meggs et al. | |
| 2014/0190389 | A1 | 7/2014 | Montousse | |
| 2014/0213662 | A1 | 7/2014 | Boris et al. | |
| 2015/0065974 | A1 | 3/2015 | Michiels et al. | |
| 2015/0086270 | A1 | 3/2015 | Shany et al. | |
| 2017/0233967 | A1 | 8/2017 | Shany et al. | |
| 2020/0181862 | A1 | 6/2020 | Shany et al. | |
| 2020/0181863 | A1 | 6/2020 | Shany et al. | |

(56) References Cited

U.S. PATENT DOCUMENTS

FOREIGN PATENT DOCUMENTS

| | | |
|---|---|---|
| CN | 201103116 | 8/2008 |
| CN | 201531015 | 7/2010 |
| CN | 101956386 | 1/2011 |
| DE | 4237185 | 5/1994 |
| EP | 0033238 | 8/1981 |
| EP | 1762429 | 3/2007 |
| GB | 1383315 | 2/1974 |
| JP | 49-034139 | 3/1974 |
| JP | 49-021946 | 5/1974 |
| JP | 49-062927 | 9/1974 |
| JP | 49-119133 | 11/1974 |
| JP | 2000-170144 | 6/2000 |
| JP | 2001-348562 | 12/2001 |
| JP | 2005-299115 | 10/2005 |
| WO | WO 91/05918 | 5/1991 |
| WO | WO 91/08348 | 6/1991 |
| WO | WO 92/09750 | 6/1992 |
| WO | WO 92/09751 | 6/1992 |
| WO | WO 92/09752 | 6/1992 |
| WO | WO 03/000996 | 1/2003 |
| WO | WO 2004/072413 | 8/2004 |
| WO | WO 2008/023094 | 2/2008 |
| WO | WO 2008/132461 | 11/2008 |
| WO | WO 2011/163383 | 12/2011 |
| WO | WO 2012/011937 | 1/2012 |
| WO | WO 2013/156998 | 10/2013 |
| WO | WO 2016/059637 | 4/2016 |
| WO | WO 2019/021272 | 1/2019 |

OTHER PUBLICATIONS

Official Action dated Dec. 15, 2017 From the US Patent and Trademark Office Re. U.S. Appl. No. 15/518,494. (18 pages).
Notice of Amendment dated Jul. 5, 2018 From the State Intellectual Property Office of the People's Republic of China Re. Application No. 201830031303.9 and Its Translation Into English.
Applicant-Initiated Interview Summary dated Dec. 14, 2016 From the US Patent and Trademark Office Re. U.S. Appl. No. 14/394,281 (3 pages).
Communication Pursuant to Article 94(3) EPC dated Nov. 3, 2016 From the European Patent Office Re. Application No. 13777827.0. (5 Pages).
Communication Relating to the Results of the Partial International Search dated Jan. 14, 2016 From the International Searching Authority Re. Application No. PCT/IL2015/051025.
International Preliminary Report on Patentability dated Jan. 3, 2017 From the International Preliminary Examining Authority Re. Application No. PCT/IL2015/051025. (33 Pages).
International Preliminary Report on Patentability dated Oct. 30, 2014 From the International Bureau of WIPO Re. Application No. PCT/IL2013/050325.
International Search Report and the Written Opinion dated Aug. 11, 2013 From the International Searching Authority Re. Application No. PCT/IL2013/050325.
International Search Report and the Written Opinion dated Apr. 12, 2016 From the International Searching Authority Re. Application No. PCT/IL2015/051025.
Notification of Office Action and Search Report dated Sep. 28, 2015 From the State Intellectual Property Office of the People's Republic of China Re. Application No. 201380031112.7 and Its Translation of Office Action in English.
Notification of Office Action dated Jun. 3, 2016 From the State Intellectual Property Office of the People's Republic of China Re. Application No. 201380031112.7.
Official Action dated Jun. 20, 2017 From the US Patent and Trademark Office Re. U.S. Appl. No. 15/518,494. (15 pages).
Official Action dated Jan. 23, 2017 From the US Patent and Trademark Office Re. U.S. Appl. No. 14/394,281. (23 pages).
Official Action dated Aug. 24, 2016 From the US Patent and Trademark Office Re. U.S. Appl. No. 14/394,281.
Official Action dated Mar. 24, 2016 From the US Patent and Trademark Office Re. U.S. Appl. No. 14/394,281.
Official Action dated Sep. 24, 2015 From the US Patent and Trademark Office Re. U.S. Appl. No. 14/394,281.
Supplementary European Search Report and the European Search Opinion dated Nov. 26, 2015 From the European Patent Office Re. Application No. 13777827.0.
Translation of Notification of Office Action dated Jun. 3, 2016 From the State Intellectual Property Office of the People's Republic of China Re. Application No. 201380031112.7.
Written Opinion dated Aug. 4, 2015 From the Intellectual Property Office of Singapore Re. Application No. 11201406559V.
Written Opinion dated May 16, 2016 From the Intellectual Property Office of Singapore Re. Application No. 11201406559V.
Written Opinion dated Nov. 28, 2016 From the Intellectual Property Office of Singapore Re. Application No. 11201406559V. (7 Pages).
Written Opinion dated Sep. 28, 2016 From the International Preliminary Examining Authority Re. Application No. PCT/IL2015/051025.
Fang et al. "Optimization of An Oil Boom Arrangement", Proceedings of the International Oil Spill Conference, 2001(2): 1367-1374, Mar. 2001.
Search Report and Written Opinion dated Dec. 1, 2017 From the Intellectual Property Office of Singapore, IPOS Re. Application No. 11201702883T. (10 Pages).
Notice of Intention to Refuse Patent Application and Examination Report dated Oct. 26, 2017 From the Intellectual Property Office of Singapore, IPOS Re. Application No. 11201406559V. (8 Pages).
ASTM "Standard Specification for Oil Spill Response Boom Connection: Slide Connector", ASTM International, Designation F 2438-04, p. 1-5, Dec. 2004.
Applicant-Initiated Interview Summary dated Nov. 20, 2018 From the US Patent and Trademark Office Re. U.S. Appl. No. 15/518,494. (3 Pages).
Requisition by the Examiner dated Nov. 20, 2018 From the Canadian Intellectual Property Office Re. Application No. 179300. (2 pages).
Examination Review Report dated Jan. 21, 2019 From the Intellectual Property Office of Singapore Re. Application No. 11201406559V. (10 Pages).
Notice Of Allowance dated Feb. 4, 2019 From the US Patent and Trademark Office Re. U.S. Appl. No. 29/611,603. (10 pages).
International Search Report and the Written Opinion dated Nov. 6, 2018 From the International Searching Authority Re. Application No. PCT/IL2018/050806. (14 Pages).
Requisition by the Examiner dated Dec. 28, 2018 From the Innovation, Science and Economic Development Canada, Canadian Intellectual Property Office Re. Application No. 2,870,384. (6 Pages).
Notification of Office Action and Search Report dated Oct. 15, 2018 From the State Intellectual Property Office of the People's Republic of China Re. Application No. 201580060860.7 and Its Summary in English. (14 Pages).
Office Action dated Sep. 2, 2018 From the Israel Patent Office Re. Application No. 61534 (3 pages).
Official Action dated Aug. 24, 2018 From the US Patent and Trademark Office Re. U.S. Appl. No. 15/518,494. (19 pages).
Translation dated Oct. 25, 2018 of Notification of Office Action dated Oct. 15, 2018 From the State Intellectual Property Office of the People's Republic of China Re. Application No. 201580060860. 7. (13 Pages).
Alamy "Floating Containment Boom", retrieved from alamy.com, 1 Page, 2018.
Alamy "High Seas Oil Containment Boom in the Mediterranean Ocean", retrieved from alamy.com, 1 Page, 2018.
Alibaba "Oil Spill Containment Boom", retrieved from alibaba.com, 1 Page, 2018.
Chinacsw "Harbor Floating Spill Containment Boom", retrieved from chinacsw.com, 1 Page, 2009-2018.
Chinacsw "Silt Curtain, Oil Containment Boom and Oil Spill Containment Berm", retrieved from Chinacsw.com, 1 Page, 2018.

(56) References Cited

OTHER PUBLICATIONS

Ipieca "The Global Oil and Gas Industry Association for Environmental and Social Issues", retrieved from ipieca.org, 48 Pages, 2015.
Mavideniz "Oil Fence Boom", retrieved from mavideniz.com, 1 Page, 2018.
Nautic Expo "Harbor Boom", retrieved from nauticexpo.com, 1 Page, 2018.
Shutterstock "Containment Boom Temporary Floating Barrier Used Stock Photo", retrieved from Shutterstock.com, 1 Page, 2018.
Notice of Eligibility for Grant and Examination Report dated Oct. 19, 2018 From the Intellectual Property Office of Singapore, IPOS Re. Application No. 11201702883T. (5 Pages).
Restriction Official Action dated Nov. 2, 2018 From the US Patent and Trademark Office Re. U.S. Appl. No. 29/611,603. (16 pages).
Notice of Reasons for Rejection dated May 10, 2019 From the Japan Patent Office Re. Application No. 2017-540340 and Its Translation (Summary) Into English. (26 Pages).
Notification of Office Action dated May 31, 2019 From the State Intellectual Property Office of the People's Republic of China Re. Application No. 201580060860.7 and Its Summary in English. (11 Pages).
Official Action dated Apr. 18, 2019 From the US Patent and Trademark Office Re. U.S. Appl. No. 15/518,494. (33 pages).
Notice Of Allowance dated Jul. 29, 2019 From the US Patent and Trademark Office Re. U.S. Appl. No. 15/518,494. (13 pages).
Search Report and Written Opinion dated Jul. 31, 2019 From the Intellectual Property Office of Singapore, IPOS Re. Application No. 10201811334Q. (10 Pages).
Requisition by the Examiner dated Sep. 10, 2019 From the Innovation, Science and Economic Development Canada, Canadian Intellectual Property Office Re. Application No. 2,870,384. (3 Pages).
Communication Pursuant to Article 94(3) EPC dated Oct. 31, 2019 From the European Patent Office Re. Application No. 13777827.0. (4 Pages).
International Preliminary Report on Patentability dated Feb. 6, 2020 From the International Bureau of WIPO Re. Application No. PCT/IL2018/050806. (8 Pages).
Search Report and Opinion dated Jan. 28, 2020 From the Servico Publico Federal, Ministerio da Economia, Instituto Nacional da Propriedade Industrial do Brasil Re. Application No. BR112014025728-0 and Its Summary in English. (6 Pages).
Search Report and Written Opinion dated Jan. 3, 2020 From the Intellectual Property Office of Singapore, IPOS Re. Application No. 10201811334Q. (7 Pages).
Notification of Office Action dated Apr. 2, 2020 From the State Intellectual Property Office of the People's Republic of China Re. Application No. 201580060860.7 and Its Translation Into English. (35 Pages).
Search Report and Explanations dated Jun. 5, 2020 From the Servico Publico Federal, Ministerio da Economia, Instituto Nacional da Propriedade Industrial do Brasil Re. Application No. BR112017007694-2 and Its Summay in English. (5 Pages).
Notification of Office Action dated Mar. 3, 2021 From the State Intellectual Property Office of the People's Republic of China Re. Application No. 201580060860.7 and Its English Summary. (6 Pages).
Translation dated Mar. 15, 2021 of Notification of Office Action dated Mar. 3, 2021 From the State Intellectual Property Office of the People's Republic of China Re. Application No. 201580060860.7. (4 Pages).
Official Action dated Apr. 16, 2020 from the US Patent and Trademark Office Re. U.S. Appl. No. 16/752,824. (11 pages).
Official Action dated Jun. 22, 2020 from the US Patent and Trademark Office Re. U.S. Appl. No. 16/633,217. (7 pages).
Search Report and Explanations dated Jun. 5, 2020 From the Brazilian Patent and Trademark Office Re. Application No. BR112017007694-2 and Its Summary in English. (5 Pages).

\* cited by examiner

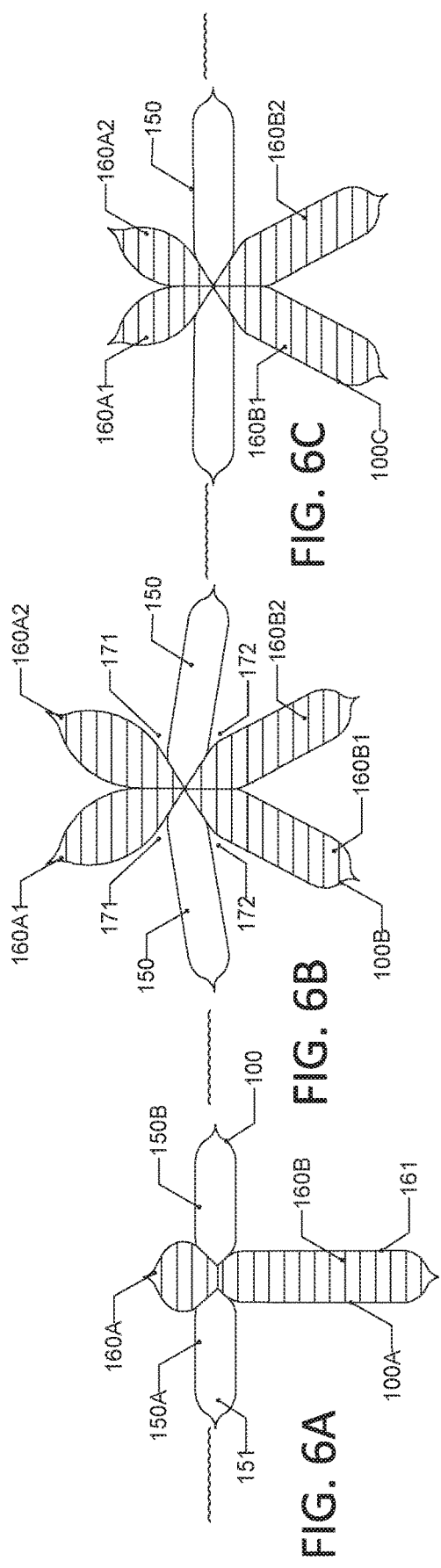

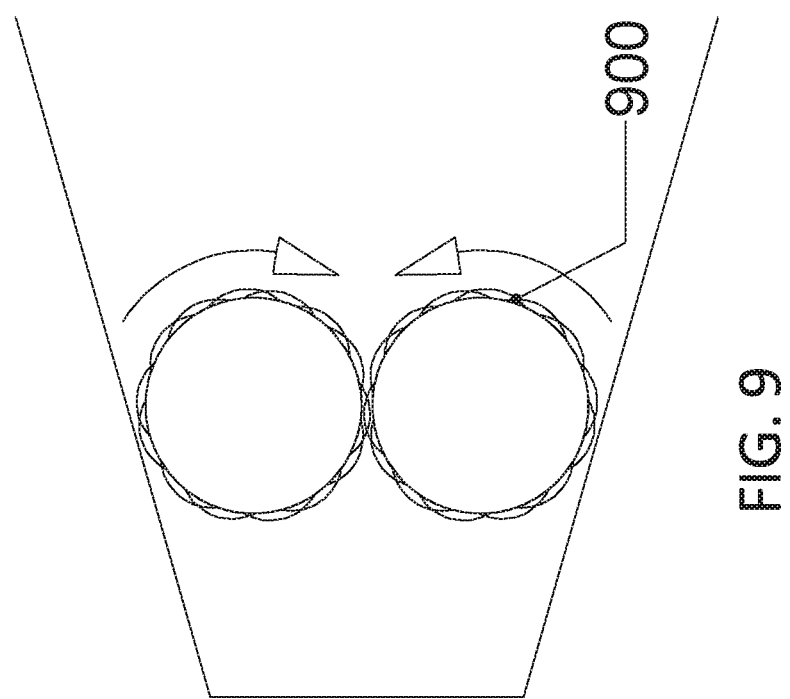

RAPID-DEPLOYMENT OIL SPILL CONTAINMENT BOOM AND METHOD OF DEPLOYMENT

RELATED APPLICATIONS

This application is a Continuation of U.S. patent application Ser. No. 14/394,281 Filed on Oct. 14, 2014 which is a National Phase of a PCT Patent Application No. PCT/IL2013/050325 having International Filing Date of Apr. 14, 2013 which claims the benefit of priority under 35 USC § 119(e) of U.S. Provisional Patent Application No. 61/624,353 filed Apr. 15, 2012, and of U.S. Provisional Patent Application No. 61/696,260 filed Sep. 3, 2012. The contents of the above applications are all incorporated by reference as if fully set forth herein in their entirety.

FIELD AND BACKGROUND OF THE INVENTION

The present invention, in some embodiments thereof, relates to a mechanical boom deployable in water and, more particularly, but not exclusively, to an inflatable boom designed for rapid deployment at the site of accidental spillage of oil or other environmentally destructive floating materials. The environmental depredations and economic damage caused by oil spills are, unfortunately, well known. Methods generally employed today to deal with accidental old spills and similar situations generally involve towing, to the site of the spill, a large mechanical boom (e.g. a floating oil barrier) which comprises a flotation element which keeps the boom on the surface of the water, and a heavy ballast hanging below the flotation element to provide a wall-like vertical extension reaching below the level of the oil spill. Because such booms are both heavy and cumbersome and because they require relatively large and trained crews to deploy, the booms are not stored in significant lengths at potential spill sites but rather at central locations or at facilities specialized in oil spill response. Such booms, when deployed in time, sometimes successfully contain spilled oil (or other damaging spilled materials). However, since these booms sometimes need to be brought by towing (so relatively slowly) and often from relatively distant sources, booms currently in use today sometimes require a great length of time from the moment a spill is discovered to the moment that boom is brought into play to contain the spilled material. In the interval, while waiting for the boom to arrive on site, the spilled material spreads out over the surface of the water, may be churned by waves, driven by winds, moved by currents, and generally tends to extend to large surface areas. These large surface areas then need to be partially surrounded by a boom to start treating the spill. The more time it takes for the boom to arrive on site, the longer the boom needed, and the longer the boom deployment procedure will take. In some cases, while waiting for the boom to arrive, the spill sub-divides into many small separated spill areas, which then must be treated individually. Indeed, in some spill scenarios, arrival of boom equipment to the spill site happens at such a late stage that the arriving booms, instead of being deployed to surround the spill, are deployed near beaches to protect the beaches from the uncontained drifting oil.

Booms in common use today typically comprise a heavy ballast material hanging below a flotation element, and generally are transferred from a storage area to a spill site. The towing process is necessarily slow, especially when there is need, as often happens, to tow the boom in a direction perpendicular to the boom surface, for example to approach the boom to a spill area or to tow spilled material trapped by the boom. Such booms, being bulky, are typically stored in central locations not necessarily in proximity to likely spill sites. The towing or other deployment process generally requires the boom to be built from very durable materials and to incorporate elements that will withstand the towing forces. In addition, large and generally powerful ships are needed to tow the boom portions and/or to otherwise deploy the boom. Finally, current booms typically require large crews that were trained extensively at operating the machinery. The need for a crew adds additional time to the process, since before the booms can be deployed, the crew needs to be gathered and brought to staging location. All these characteristics of conventional containment booms combine to produce a situation where booms usually cannot be rapidly deployed at spill sites, resulting in extensive spreading of the spilled material before the boom containment procedure can even be begun. As a result, containment is sometimes impossible, sometimes only partial or otherwise ineffective, and always expensive, and recovery or treatment of the spilled material is often partial at best.

Some attempts have been made to provide booms which do not need to be towed to a spill site. For example, U.S. Pat. No. 5,197,821 to Richard E. Cain et al., filed in 1991, describes an accordion folded uninflated boom curtain comprising a self-inflating flotation chamber inflated by gas on one longitudinal edge with an integral depending curtain terminating in a self-inflating ballast chamber inflated by the water or sea water on the opposing longitudinal edge. However, Cain's invention has apparently proven ineffective, as witnessed by the fact that it is not generally used in spill containment. Additional background art includes U.S. Pat. No. 5,074,709 filed Dec. 24, 199,
U.S. Pat. No. 5,040,918 filed Apr. 23, 1990,
U.S. Pat. No. 5,120,159 filed Mar. 25, 1991,
U.S. Pat. No. 3,563,036 filed Sep. 2, 1969,
U.S. Pat. No. 5,580,185, Filed Oct. 30, 1995,
U.S. Pat. No. RE28966 filed Jan. 24, 1974,
U.S. Pat. No. 5,238,327 filed Apr. 9, 1992,
U.S. Pat. No. 4,124,981 filed Sep. 29, 1977,
U.S. Pat. No. 5,885,451 filed Oct. 31, 1990, and
U.S. Pat. No. 4,997,745 filed Dec. 29, 1989.

SUMMARY OF THE INVENTION

Some embodiments of the present invention may solve some of the problems in oil spill containment outlined in the background section above, by providing effective booms capable of containing oil spills, which booms can be economically stored at or near potential spills sites and/or on board spill sources such as ships, oil rigs, and the like, and can be deployed with great rapidity using relatively inexpensive deployment means. Such booms may therefore encircle and contain newly discovered spills before the spilled material spreads far from the spill source and before it subdivides into separated slicks.

Embodiments of the boom include booms manufactured in situ from one or more uninflated sleeves made of plastic or other material. The term "sleeve" is generally used herein to refer to a long hollow structure made of a film (optionally multi-layer) laterally closed (for example, a hollow cylinder) optionally divided into segments and further subdivided to provide flotation compartments, water compartments, or both. Optionally, a sleeve may be formed from two long rectangular pieces of film welded together at their edges and further welded to create compartments. Optionally, a sleeve may be formed from a single long rectangular pieces of film folded over lengthwise and with welded together along their free lateral edges, and further welded to create compartments. Optionally, a sleeve may be formed as an extruded tube. Examples of material suitable for creating sleeves as described herein are specified below.

In some embodiments the booms are wholly or partially self-inflating. In some embodiments deployment equipment includes modules for inflating the boom with air and water. Some embodiments comprise water compartments at least possibly raised above the water level of ambient water when the boom is deployed in ambient water. In some embodiments a plurality of sleeves are interleaved during manufacture, and become semi-rigid when inflated, flotation compartments and water-filled compartments being held it semi-rigid geometrical relation to each other by forces induced by filling and inflation of the compartments.

In some embodiments a boom comprises only a plastic and similar sleeve (optionally including one-way valves) when uninflated, and only gas and water are added when inflated.

In manufacturing of some embodiments, two, three, or more sleeves, each comprising inflatable compartments, are interleaved, and are held in a semi-rigid geometrical relationship to each other when their compartments are inflated. In some embodiments gas and water (e.g. air and water) are mixed when inflating some compartments. In some embodiments two or more water compartments and/or a water compartment with two or more extensions are connected to a flotation device. In some embodiments, a portion of the boom above the water level comprises a plurality of extensions. In some embodiments, an angle between the lowest flotation device and a portion of the boom extending above that lowest flotation device is an acute angle.

In some embodiments a boom collector collects a boom after deployment and use, optionally comprising a machine for puncturing the boom, optionally comprising a machine for shredding the boom, optionally comprising a machine for reeling it in for storage in a reel.

In some embodiments, a boom surrounding a spill is allowed to float freely, without attachment, optionally with an attached beacon and/or transmitter. In some embodiments a boom comprises a flotation device and a compartment containing water in which at least part of said contained water is maintained by the flotation device above water level of said ambient water.

In some embodiments, a deployment craft is used to surround a spill with a boom at least 200 meters long within 15 minutes of detecting the spill.

According to an aspect of some embodiments of the present invention there is provided a method for limiting the spread of a spill of floating substances spilled into water, comprising:

a) preparing in advance at least one uninflated sleeve which comprises inflatable compartments selected from a group consisting of a flotation compartments and a water compartments;

b) utilizing a deployment craft to navigate around the spill while manufacturing and deploying portions of a spill-blocking boom, by i) inflating the boom by inflating the flotation-compartments with a gas and by at least partially filling the water compartments with water so that pressures exerted between the flotation compartments and the water compartments after the at least partial filling and the inflation maintain at least some of the flotation compartments and at least some of the water compartments in at least a semi-rigid geometrical relationship one with another; and ii) deploying the boom in water near the spill while navigating around the spill, thereby creating and deploying around at least a portion of the spill a boom which limits spread of the spill.

According to some embodiments of the invention, the at least one uninflated sleeve comprises segments each having at least one inflatable or fillable compartment.

According to some embodiments of the invention, inflating of the segments is performed sequentially and deploying of the boom is performed progressively while the deployment craft is moving along an edge of the spill.

According to some embodiments of the invention, the method further comprises interleaving segments of a first uninflated sleeve with segments of a second uninflated sleeve prior to completion of the filling and inflating.

According to some embodiments of the invention, pressures induced by the filling and inflating hold the interleaved segments in at least a semi-rigid geometrical relationship one to another.

According to some embodiments of the invention, a segment of the first sleeve interleaves with a single segment of the second sleeve.

According to some embodiments of the invention, a segment of the first sleeve interleaves with a plurality of segments of the second sleeve.

According to some embodiments of the invention, the method further comprises interleaving segments of a first uninflated sleeve with segments of a second uninflated sleeve and with segments of a third uninflated sleeve.

According to some embodiments of the invention, the method comprises surrounding the spill with the manufactured boom.

According to some embodiments of the invention, a cross-sectional profile of flotation compartments of at least a majority of the segments has a width at least 1.5 times greater than its height.

According to some embodiments of the invention, the method further comprises using an inflation module to introduce water into the water compartments under pressure.

According to some embodiments of the invention, the method further comprises releasing a spring-loaded water compartment under water so as to inflate the water compartment through a one-way valve in the water compartment.

According to some embodiments of the invention, the method further comprises deploying in water a water compartment which comprises openings and further comprises a water-absorbent material, thereby causing the water compartment to auto-inflate.

According to some embodiments of the invention, the method further comprises utilizing a chemical reaction to create a gas within at least some of the flotation compartments, thereby inflating them.

According to some embodiments of the invention, the method further comprises releasing a spring-loaded flotation compartment in air so as to allow the flotation compartment to auto-inflate through a one-way valve in the flotation compartment.

According to some embodiments of the invention, the method further comprises utilizing a controller receiving information from a sensor to detect an edge of the spill, and using the controller to calculate a steering command for the deployment craft.

According to some embodiments of the invention, the method further comprises storing materials and devices for manufacturing the boom at a potential spill site, preloaded on a boat less than 10 m in length.

According to some embodiments of the invention, the method further comprises launching the deployment craft and beginning manufacture of the boom within 5 minutes of detection of the spill.

According to some embodiments of the invention, the method further comprises manufacturing the boom at a rate of more than 5 meters per minute.

According to some embodiments of the invention, the method further comprises deploying a boom at least 200 meters long within 15 minutes of detecting the spill.

According to some embodiments of the invention, the method further comprises connecting one part of the manufactured boom to another part of the manufactured boom to form a continuous barrier around the spill.

According to some embodiments of the invention, the method further comprises manufacturing the boom at a speed approximately equal to the speed at which the deployment craft advances around the spill.

According to some embodiments of the invention, the method further comprises influencing shape of the manufactured boom by selectively controlling pressure of substances used to fill and inflate the fillable and inflatable compartments.

According to some embodiments of the invention, the method further comprises selecting, as a function of environmental conditions, a quantity of water to be introduced into a portion of a water compartment which will be positioned above water level when the boom is deployed.

According to some embodiments of the invention, the method further comprises selecting, as a function of environmental conditions pressures of materials used to fill and inflate the compartments.

According to some embodiments of the invention, the method further comprises storing the uninflated sleeve material in a reel containing a rolled sleeve.

According to some embodiments of the invention, the reel comprises informational markings imprinted on portions of the sleeve during manufacture of the sleeve and readable during manufacture of the boom, and further comprises utilizing the readable information to control an aspect of manufacturing of the boom.

According to some embodiments of the invention, the method further comprises using an electronic reader to read the information, and using the information to calculate commands for an automatically controlled aspect of the manufacturing of the boom.

According to some embodiments of the invention, the method further comprises using a same tool both to connect portions of the sleeve to each other thereby creating the compartments and to mark the sleeve with the information.

According to some embodiments of the invention, the method further comprises using a tension sensor to measure tension exerted on a portion of manufactured boom by portions of the boom deployed in the water, and using information provided by the tension sensor to calculate a command to at least one of
  a) equipment manufacturing the boom; and
  b) a motor imparting movement to the deployment craft.

According to some embodiments of the invention, the deployment craft is a boat of at most 10 meters in length.

According to some embodiments of the invention, the method further comprises allowing the continuous barrier around the spill to float freely, unattached to anything.

According to some embodiments of the invention, the continuous barrier around the spill comprises at least one of a group consisting of a beacon and a transmitter.

According to some embodiments of the invention, the method further comprises dispensing, with the boom, one of a group consisting of
  a) an oil-absorbing layer;
  b) an oil-degrading material;
  c) a chemical dispenser;
  d) a biological dispenser.

According to some embodiments of the invention, the boom is color coded according to at least one of a group of color codes consisting of
  a) colors indicating standard lengths of boom, to facilitate judging length of said boom from a distance; and
  b) colors indicating positions of openable attachments of said boom, to facilitate locating said openable attachments from a distance.

According to an aspect of some embodiments of the present invention there is provided a boom for containing a floating material spilled in water, comprising a first sleeve which comprises a plurality of gas-inflatable compartments and a second sleeve which comprises a plurality of water-inflatable compartments, the sleeves being so interleaved that inflation of the air and water compartments connects the sleeves and forces the air and water compartments into at least a semi-rigid geometrical configuration.

According to some embodiments of the invention, the boom further comprises a third sleeve which comprises a plurality of water compartments.

According to some embodiments of the invention, materials contained in compartments of the sleeve, when deployed, are not substantially heavier than water.

According to an aspect of some embodiments of the present invention there is provided a boom for containing a floating material spilled in water, comprising
  a) an inflatable flotation compartment wider than it is high, so designed that hydrodynamic forces tend to maintain its wide dimension parallel to surface of water on which it floats, when the flotation compartment is inflated and floating on water; and
  b) a water-inflatable compartment maintained by inflation forces in a position approximately perpendicular to the flotation device wide surface when the flotation compartments and water compartments are inflated.

According to some embodiments of the invention, the boom contains not more than 1% by volume of material heavier than water.

According to some embodiments of the invention, width of the flotation compartment is at least 1.25 times height of the flotation compartment.

According to some embodiments of the invention, the boom further comprises an end connector manufactured as part of the sleeve, and useable to connect a boom portion manufactured from one reel of sleeve material to a boom portion manufactured from another reel of sleeve material.

According to some embodiments of the invention, the connector is also used as the axis for the boom reel.

According to some embodiments of the invention, inflatable compartments in the sleeve alternate with non-inflatable portions along the boom, and the non-inflatable portions are more flexible than inflatable portions when the inflatable portions are inflated.

According to some embodiments of the invention, the boom, exclusive of contained air and water, weighs at most 0.45 kg/meter length.

According to some embodiments of the invention, the boom further comprises flotation compartments which comprise portions which, when deployed in ambient water, extend along a surface of the ambient water, and the extended portions comprises edges angled downwards when so deployed.

According to some embodiments of the invention, a degree by which the edges angle downward varies as a function of inflation pressures used in the inflatable compartments.

According to some embodiments of the invention, the boom further comprises a fillable compartment at least partially filled with water and which is at least partially raised above ambient water lever by the flotation device when the boom is deployed in ambient water.

According to an aspect of some embodiments of the present invention there is provided a boom for containing a floating material spilled in water, which boom, when deployed in water, comprises:

a) flotation compartment containing gas and serving as a flotation device for the boom;

b) a compartment comprising a material at least as heavy as water which is pendent from and is positioned below the flotation device when the boom is deployed in water; and c) a compartment at least partially filled with water, in which at least some of the filling water is positioned above ambient water level when the boom is deployed in ambient water.

According to some embodiments of the invention, the pendent compartment is a fillable compartment in a sleeve and is at least partially filled with water.

According to some embodiments of the invention, the pendent compartment is filled by nothing heavier than water.

According to some embodiments of the invention, the compartment containing water positioned above ambient water level is an extension of the pendent compartment and has a common lumen therewith.

According to some embodiments of the invention, the compartment containing water positioned above ambient water level is independent of the pendent compartment and has no common lumen therewith.

According to some embodiments of the invention, a compartment containing water positioned above ambient water level contains both a liquid and a gas.

According to some embodiments of the invention, the boom comprises a sleeve and the sleeve comprises the flotation compartment, the pendent compartment, and the compartment containing water positioned above ambient water level.

According to some embodiments of the invention, the boom comprises a first sleeve which comprises the flotation compartment interleaved with a second sleeve which comprises the pendent, the first and second sleeves being held in at least semi-rigid relation to each other when the flotation compartment is inflated with a gas and the pendent compartment is filled with water.

According to an aspect of some embodiments of the present invention there is provided a boom for containing a floating material spilled in water, comprising a) an inflatable flotation compartment; and b) at least two water-inflatable compartments maintained below the flotation compartment when the boom is deployed.

According to some embodiments of the invention, the boom comprises at least four extensions of the water-inflatable compartments, at least two positioned below the flotation compartments and at least two at least partially maintained above ambient water level when the boom is deployed in ambient water.

According to an aspect of some embodiments of the present invention there is provided a boom collector for collecting a boom after deployment in water, comprising a machine for puncturing flotation compartments and water compartments of the boom and one of a group consisting of a) a compressing device for compressing portions of the boom after the portions are substantially emptied of gas and of water;

b) a reel for reeling in the boom after the portions are substantially emptied of gas and of water; and c) a shredder for shredding the sleeve.

According to an aspect of some embodiments of the present invention there is provided a method for limiting the spread of a spill of floating substances spilled into water, comprising:

a) surrounding at least a portion of the spill with a floating barrier which substantially prevents passage of the spilled material across the barrier; and b) allowing the barrier to float freely in a water environment, absent physical connections to boats and to objects in fixed physical positions.

According to some embodiments of the invention, the method further comprises attaching at least one of a group consisting of a beacon and a transmitter to the freely floating barrier.

According to an aspect of some embodiments of the present invention there is provided a boom for preventing passage of a spilled material floating in ambient water, comprising a) a flotation device; and b) a compartment containing water in which at least part of the contained water is maintained by the flotation device above water level of the ambient water.

According to an aspect of some embodiments of the present invention there is provided a method for limiting spread of a spill of floating material in water, comprising using a deployment craft to surround the detected spill with a boom at least 200 meters long within 15 minutes of detecting the spill.

According to some embodiments of the invention, the boom comprises a sleeve with fillable compartments, and the compartments are filled with materiel not heavier than water.

According to an aspect of some embodiments of the present invention there is provided a method of using a deployment craft to deploy a spill-containing boom, comprising using a tension sensor to measure tension exerted on a portion of manufactured boom by portions of the boom deployed in the water, and using information provided by the tension sensor to calculate a command to at least one of a) equipment manufacturing the boom; and b) a motor imparting movement to the deployment craft.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A-6F present simplified cross-sectional schematics of a plurality of boom configurations, according to some embodiments of the present invention;

FIGS. 8 and 9 are simplified schematics of machines useable to collect a boom after use, according to some embodiments of the present invention.

DESCRIPTION OF SPECIFIC EMBODIMENTS OF THE INVENTION

Figure 1:
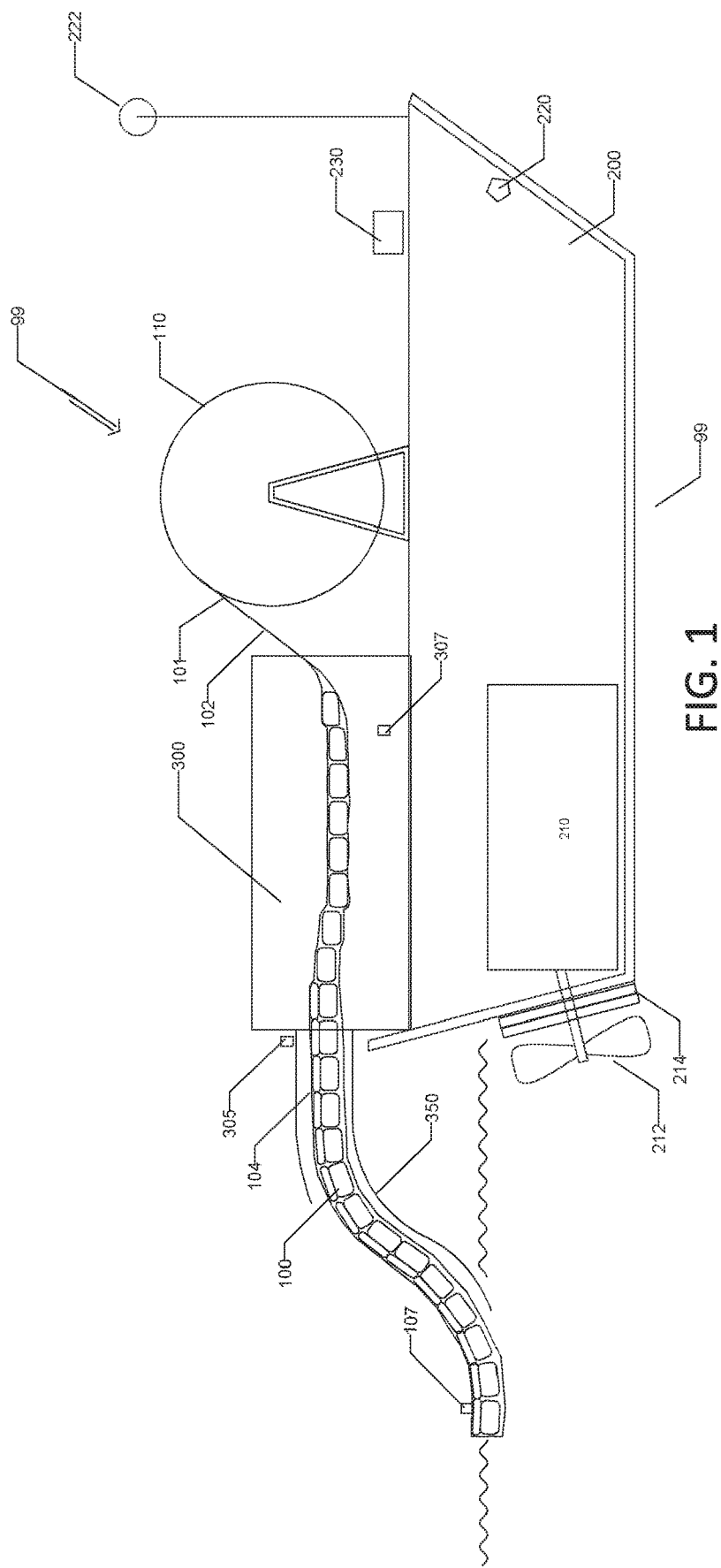
FIG. 1 is a simplified schematic of a boom manufacturing module storable at a potential spill site, according to some embodiments of the present invention.

The present invention, in some embodiments thereof, relates to a mechanical boom deployable in water and, more particularly, but not exclusively, to an inflatable boom designed for rapid deployment at the site of accidental spillage of oil or other environmentally destructive floating materials.

For simplicity of exposition, most of the discussion and most of the examples below related to "oil" spills and "containment" of same. However, it is to be understood that embodiments here presented may be used to contain spills of "oil" and other petroleum materials, and may also be used to contain spills of any other type of spilled product or contaminant, as long as the spill is in water and the spilled material has a tendency to float to the surface of that water. Also, although in many cases it is desirable to contain the spill by encirclement, alternative uses of the booms and boom deployment equipment described herein are contemplated. For example, a boom according to embodiments described herein may be deployed to exclude (rather than to encircle) a spilled material, for example to protect a beach, or a portion of a harbor, or a wildlife environment, by preventing entry of an uncontained spilled material into a selected area. Additionally, booms described herein may be used in contexts not involving spills, for example to contain and/or exclude floating plant life, to protect power-plant intakes and marine fish farms, and similarly fragile environments. Although not necessarily mentioned with respect to any particular embodiment presented herein, such uses are contemplated with respect to all embodiments herein described.

Some embodiments of the present invention comprise booms which are manufactured in situ, at the site of the spill, from a relatively inexpensive sleeve component or components which are pre-constructed to have inflation compartments for water and for air and optionally for combined water and air, the compartments running along most of the length of boom segments optionally joined by relatively narrow uninflatable sections or by other forms of relatively flexible joints.

The sleeve is stored in a space-efficient compressed format such as a reel or roll. Because the sleeve is relatively inexpensive and relatively much less bulky than boom components currently in use, it is practical to store it, together with an inflation module and a delivery system on or near a deployment craft on board oil-transporting vessels, on other large ships that may spill their own fuel, oil rigs or platforms, and/or in proximity to potential spill sites like harbors ports or oil terminals When a spill is detected, a boom may rapidly be constructed: a water craft or other craft (for example, a small boat, for example a boat less than 10 meters long) may be used to transport sleeve reel, inflation module and a delivery or deployment system around a spill, and to progressively construct a boom by using the inflation module to inflate water and air compartments of the sleeve and transporting the inflated boom segments into the water.

The disclosure below presents a variety of methods of use of such a boom, and a variety of configurations for forming the boom. Some of the embodiments comprise design features which render the boom relatively stable and relatively effective in blocking passage of oil or other spilled materials, while using compact, light, inexpensive, and relatively simple materials. Embodiments described in detail below can be deployed, inexpensively, rapidly, and simply, for example by two operators working from a boat 10 meters or less in length. Some embodiments provide boom deployment by an automated mechanism, also operable from a relatively small watercraft.

The fact that boom components can economically be stored on-board spill sources or near potential spill sites and/or can be rapidly transported to actual spill sites, and that an effective boom can be constructed rapidly at the site, optionally using only a small boat or other inexpensive watercraft, will in some cases make it possible to encircle and contain a spill soon after the spill is detected, while the spill is still small and undivided, and long before a conventional, relatively heavy, relatively bulky and relatively expensive boom (of the sort commonly in use today) could be towed or otherwise transported from a storage sight and brought into play.

As described in the background section above, the ability to deploy a boom within minutes of detection of a spill may in some cases simplify by as much as several orders of magnitude the complexity of a containment operation and the area of the spill to be contained.

Embodiments of the invention described in detail below include boom configurations resistant to destabilizing actions by wind and waves, and which provide effective booms that prevent passage by spilled floating material such as oil, even under rough water conditions, yet which can be constructed cheaply and rapidly at spill sites, as described above.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

General

As explained above, "time is of the essence" in containing oil spills. Once a spill has occurred or is in progress, the spilled material tends to spread out from the source, and may be spread over a large area, and may be scattered or broken up in to multiple areas by the action of wind, waves, currents, and the spills own physical properties.

Some embodiments of the present invention are expected to ameliorate the handling of oil spills and spills of similar materials because they enable rapid handling of spills, and enable a spill to be contained before the spills natural spread and the actions of winds, currents and waves have spread it over a large area. In some embodiments, this is accomplished by using on-site stored materials and/or easily and rapidly transportable materials to rapidly manufacture a containment boom at the spill site. Some embodiments, for example, will enable a small team (e.g. two people) in a small dedicated watercraft (e.g. 10 meters or less) to begin deployment of an oil containment boom according to an embodiment of the present invention within 5-10 minutes of detection of a spill, and to deploy that boom at a speed of approximately 15-30 meters per minute. In other words, according to the estimated characteristics of an exemplary embodiment, a boom 300 meters long could be in place around an oil spill within 20 minutes from the moment the spill is detected. In some embodiments, half an hour would suffice. In some embodiments an hour would be appropriate. These numbers are of course exemplary only, and not limiting, but they serve to indicate the important potential advantages of methods and devices taught herein. So far as is known to the applicant, no nearly comparable solution is known in the art at this time. They may be contrasted to methods and devices typically in use today, where bulky and relatively much more expensive booms are constructed in advance, are stored in central locations often not adjacent to potential spill sites, and then must be transported over distances to bring them into action at a detected spill. This conventional process is longer by orders of magnitude, and the spill containment and recovery problem is accordingly much more difficult by the time actual containment activities can begin. (Some sources report that rates of oil recovery today are generally less than 15%.)

It is an additional advantage of some embodiments that the delivery methodologies taught herein enable depositing the boom at or near the observed edge of the spill, which fact contributes to limiting expansion of the spill.

It is an additional advantage of some embodiments that some spills, when rapidly and exactly encircled by a boom within minutes of spill detection, may be sufficiently concentrated to enable on-site burning of the spilled material and/or to facilitate chemical and/or biological treatment. (The contained spill, having been encircled before it has a chance to spread out, may provide a relatively high concentration of the spilled material within the boom containment.) Similarly, skimming is facilitated under these circumstances.

It is an additional advantage of some embodiments that the amount of chemical and/or biological dispersants or other products used in spills (which are expensive, and not necessarily benign to the environment) is relatively less that required to cover the large spill areas encountered when traditional towed-boom containment is used.

On-Site Manufacture of an Inflated Boom

Some embodiments of the invention comprise a boom which comprises a prepared sleeve having segments and each segment comprises inflatable compartments. The boom is optionally deployed by a watercraft which advances around a spill while progressively mechanically inflating some compartments of the sleeve using pressurized air (or optionally another gas), and also inflating other compartments of the sleeve with water supplied under pressure. The result, as will be shown below, is a stable effective floating oil boom. A variety of exemplary designs for booms of this sort are presented in FIGS. 6A-6F and discussed herein below.

In some alternative embodiments, sleeve compartments may use various types of auto-inflation known in the art. For example, self-inflating water compartments may use compressed sponges and/or a hydrating material and/or an open-cell foam and/or a spring-loaded compartment with a one-way valve and or similar means to absorb water into the water compartments. Flotation compartments may use spring-loaded compartments having one-way valves to self-inflate with air, and/or may use a gas-producing chemical reaction such as is produced by a gas-creating binary material to self inflate, the binary materials being mixed by the action of unreeling the sleeve and/or by an action undertaken by a delivery module 350 (discussed below with reference to FIGS. 1 and 3), for example by providing an action of delivery module 350 which breaks a seal between binary materials contained in the flotation compartments, or by some other mechanical and/or chemical process. It is noted that each of the various configurations presented hereinbelow, comprising a variety of alternate exemplary geometries for a boom, may be implemented using self-inflation for water and/or flotation compartments, along with or in place of inflation module 300 (discussed with reference to FIGS. 1 and 3) and/or as with intervention (e.g. to stimulate gas production) by distribution module 350.

In some embodiments sleeves 101 are subdivided into segments, so that should a segment fail or be punctured, flotation of the boom (and the function of the water compartments) will be assured by adjacent segments.

In some embodiments segments are joined to each other by joints or hinges or other flexible portions connecting inflated or self-inflating segments, which tend to be more rigid.

In some embodiments, some sleeve material may be provided above flotation compartments. Similarly, additional sleeve material may be provided around water compartments, thereby extending them to form an extended 'skirt' which serves to extend oil-impenetrable surfaces, which surfaces, in some embodiments may tend to be substantially vertical when the boom is deployed, at least in calm water, and which may tend to be substantially perpendicular to the water surface in turbulent conditions.

Deployment Equipment

Referring now to the drawings, FIG. 1 illustrates a manufacturing module for deploying a spill boom in water.

According to some embodiments of the present invention, a method for limiting the spread of oil or other floating substances spilled into water comprises providing a boom manufacturing module 99 at a potential spill site. According to additional embodiments the method comprises rapidly transporting module 99, or parts thereof, to a spill site once a spill is detected, for example by air or by speedboat.

In some embodiments, and as shown in FIG. 1, a boom manufacturing module 99 may comprise a sleeve 101 stored as supply of uninflated sleeve material 102, an inflation module 300 for inflating compartments of sleeve 101 with air and/or water, an (optional) boat or other watercraft 200 for transporting sleeve 101 and inflation module 300 around a spill site, and a delivery module 350 for moving the manufactured boom 100 from boat to water. Sleeve 101 may be any continuous plastic or other film having inflatable compartments, as will be discussed in detail below.

Boom manufacturing module 99, being relatively inexpensive, may be prepared and 'ready to go', and stored on board or in proximity to a potential spill site. Alternatively, uninflated sleeve material 102, inflation module 300 and/or delivery module 350 may be stored in compact fashion in a central location and may be rapidly transported (e.g. by air (e.g. by helicopter), by fast water transportation (e.g. by speedboat) and/or by rapid land transportation) to a spill site. Module 99 may be stored mounted and ready on a deployment vehicle such as a boat, or may rapidly be mounted on a general-purpose boat or other vehicle when needed.

In some embodiments the sleeve material 101 used to manufacture boom 100 comprises compartments, lumens in the sleeve designed to be inflated, some compartments to be inflated by air, and some to be inflated (i.e. filled or partially filled) by water. In some embodiments, these compartments are flexible but not expandable, and therefore will become stiff and rigid or at least semi-rigid when filled with air and/or water under pressure. Specific exemplary designs for such air and water compartments are presented in detail below and with reference to FIGS. 6A-6F.

Figure 5A:
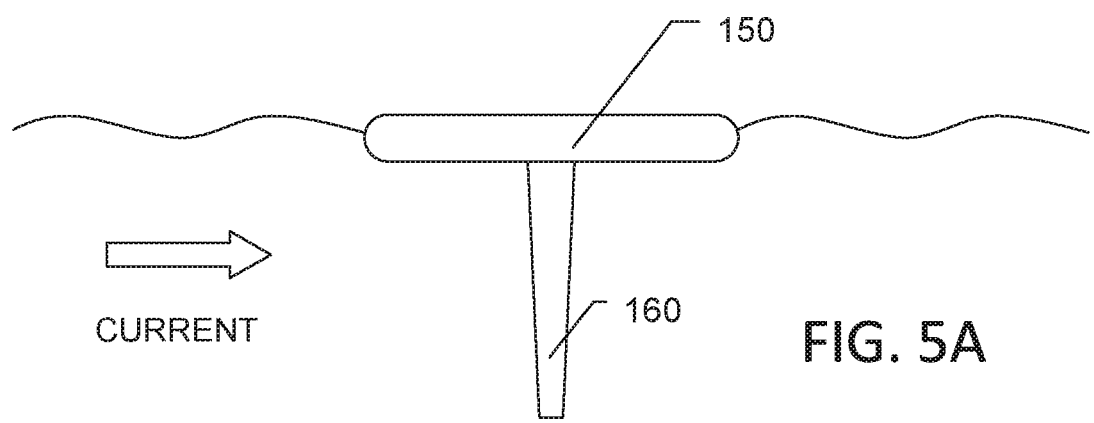
FIGS. 5A-5B present stabilization concepts used in some embodiments of the invention.
Figure 5B:
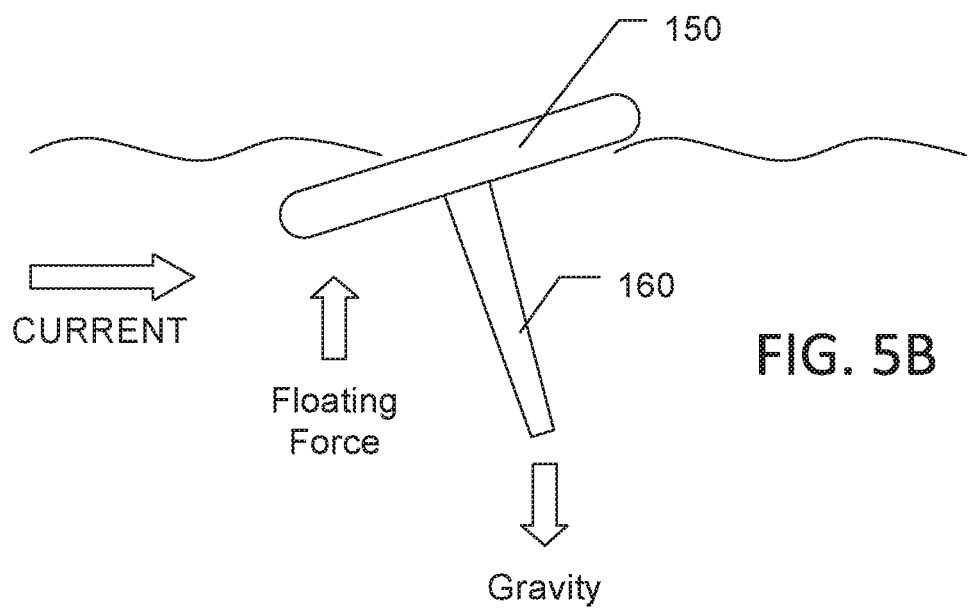
Figure 5C:
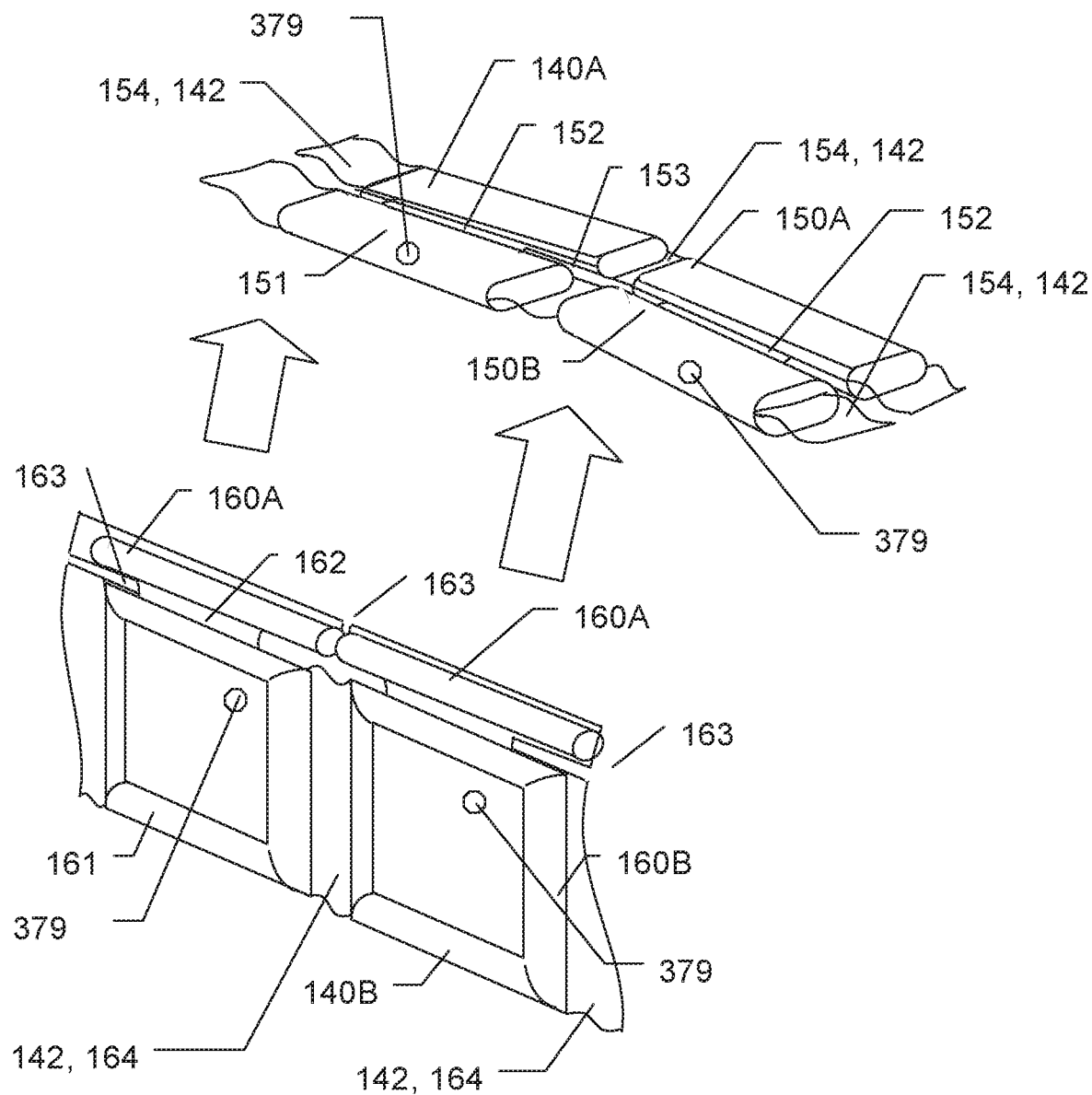
FIGS. 5C-5D present methods for interleaving sleeves when construction a boom, according to some embodiments of the invention.
Figure 5D:
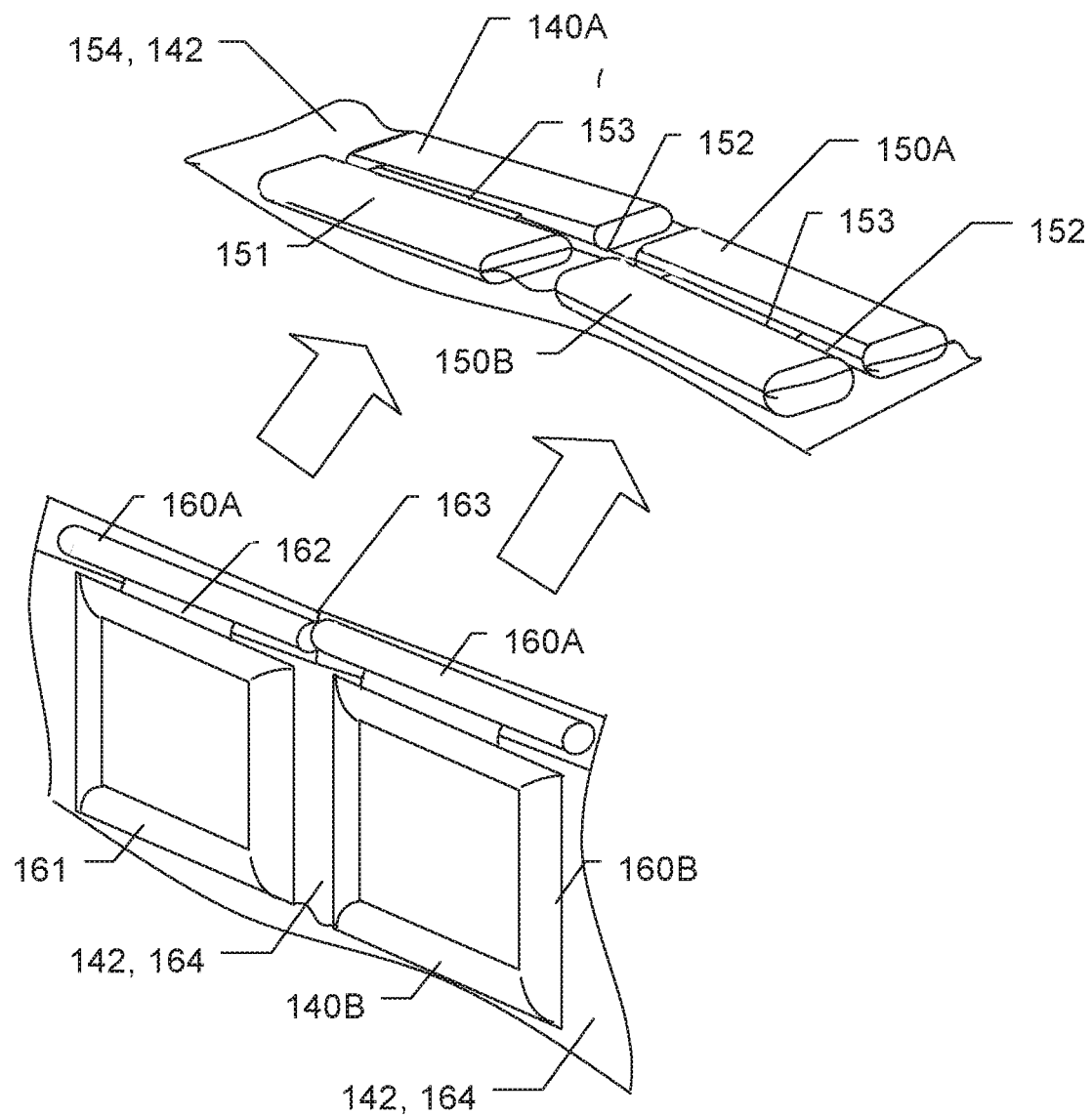

As discussed in detail inter alia with reference to FIGS. 5C and 5D, optionally, boom 100 may comprise segments 140, each segment 140 comprising at least one compartment 150 designed to be inflated by air or optionally by another gas and to provide flotation to boom 100, and at least one compartment 160 designed to be inflated by water or other liquid. (Some examples of compartments 150 and 160 are shown inter alia in FIGS. 6A-6F.) Optionally, segments 140 may be positioned along sleeve 101 in alternation with joining areas 142, which joining areas do not comprise inflatable compartments. Joining areas 142 may simply be sleeve portions without inflatable compartments, and may therefore be more flexible than are segments 140 which may tend to be stiff once their inflatable compartments 150 and 160 have been inflated. Alternatively, joining areas 142 may comprise hinges or other flexible connectors. Joining areas 142 may also comprise attachments for attaching one portion of a boom 100 to another, or for attaching a portion of a boom 100 to another object.

A length of boom 100 may comprise one sleeve 101, or more than one. An embodiment described in detail below comprises a first sleeve 101 which comprises water compartments 160, interleaved with a second sleeve 101 which comprises air compartments 150.

Figure 7A:
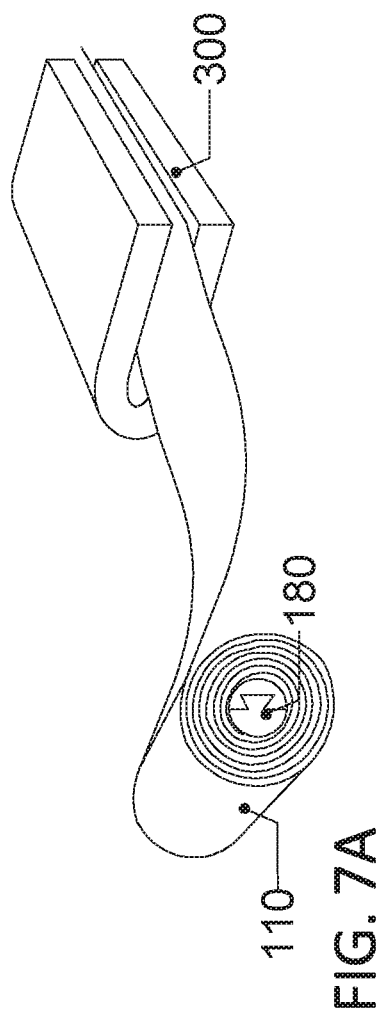
FIGS. 7A-7C are simplified schematics of methods and devices for connecting portions of a boom one to another according to some embodiments of the present invention.
Figure 7B:
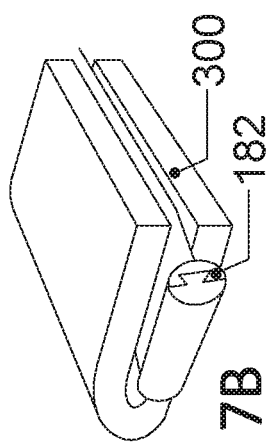
Figure 7C:
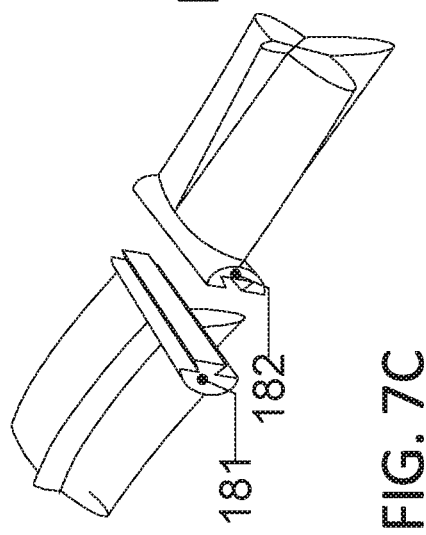

Prior to inflation, uninflated sleeve material 102, optionally previously prepared with empty compartments 150 and 160, may be stored in the form of continuous reels 110, each reel 110 comprising a convenient length of sleeve, for example 100 meters long, or 200 meters long, or 250 meters, or 300 meters. In some embodiments, a 200 meter boom weighs 30-90 Kg prior to inflation. In the event of a spill, one or more reels can be conveniently mounted on inflation module 300 on a watercraft 200, and be put rapidly to work manufacturing a boom 100. As shown in FIGS. 7A-7C, each reel 110 may optionally be provided with an end connection 180, for providing a convenient means for connecting the end portion of one reel to a beginning portion of a following reel, optionally making booms longer than the length comprised in individual reels. This connector may also act as the axis on which the reel is rolled. Reels may optionally be provided with a sealed protecting foil to enhance shelf-life during long-term storage.

Optionally, a deployment craft and/or a depot at a potential spill site and/or a central storage area may store a plurality of such reels, optionally with different characteristics, such as differences in length, in strength, in height and depth when deployed, in color, in type or shape of upper and/or lower portions of the boom when deployed. Availability of such a variety enables spill control personnel and/or automatically controlled mechanisms to select a reel or reels containing sleeves which in their opinion are best suited to the spill material, to the spill size, to the temperature, wind conditions, wave conditions, water conditions, proximity to land or other obstacles, or according to any other characteristic. A selected reel may be easily and rapidly mounted on the distribution apparatus, and reels used successively may be easily connected to each other.

FIG. 1 shows features of manufacturing module 99.

Inflation module 300 (of which an exemplary embodiment is shown in detail in FIG. 3) is operable to manufacture a boom 100 by successively inflating sections of said sleeve 101, inflating air compartments 150 with air (or optionally with another gas) and inflating water compartments 160 with water (or optionally with another liquid). In some embodiments, inflation of compartments 150 and 160 in a given segment tends to stiffen those compartments and optionally brings them (under pressure from their respective inflations)

into at least a semi-rigid geometrical relationship with each other. Examples of this are discussed in greater detail with reference to FIGS. 6A-6F, inter alia.

FIG. 1 shows a watercraft 200 capable of carrying at least one reel of sleeve material 102, an inflation module 300, and optionally a delivery module 350 which may be used to facilitate delivery of inflated or partially inflated sleeve 101 from watercraft to water. Since reels are relatively compact and light weight, according to some embodiments a deployment craft 200 could optionally easily carry five or ten 200 meter reels, enabling to connect reel sleeves end to end to create a long boom and/or enabling to select sleeves with particular characteristics according to prevailing spill and weather and water conditions.

Watercraft 200 is optionally a boat. In some situations a relatively small boat, e.g. a 10 meter boat, will suffice to hold reels 110, and inflation module 300, a delivery module 350, and two crew members to guide the boat and control the boom manufacturing operation.

Alternatively, watercraft 200 may be an unmanned boat or even a semi-submersible watercraft, for example one similar in shape to a torpedo. (The terms "boat 200" and "deployment craft 200" are also used herein, and should be understood to include watercraft which are not necessarily "boats". In fact, in some embodiments a helicopter may be used to fulfill the functions of "boat 200".)

FIG. 1 shows a boat controller 230, with wired or wireless connections (not shown) to some or all of the boat's engine 210, propeller control 212, steering mechanism 214, and to control elements (e.g. manufacture speed control) of inflation module 300 and/or of delivery module 350. Optionally, the functions of controller 230 may be divided among a plurality of processors. Optionally, boat controller 230 may receive information from sensors, optionally including a sensor 220 for measuring the speed of boat 200 relative to the water, a sensor 307 (or other information source such as a mechanical counter measuring speed of production of boom 100, a sensor 305 measuring the tension between portions of boom 100 already in the water and portions of boom 100 currently being moved toward the water, and/or additional sensors measuring ambient conditions such as water and air temperatures, water turbulence, and wind speed. In one optional use of controller 230, controller 230 uses measures of boat speed and manufacture speed and/or measures of tension induced in boom 100 by movement of boat 200, to adjust speed of boat 100, speed of inflation module 300, or both, so as to coordinate between movement of the boat in the water and the speed of boom production, so that new segments of boom are delivered to the water at approximately the same speed as the boat is moving through the water. It may be appreciated that if module 99 is equipped to accomplish this coordination (at least approximately), then little in the way of towing tension (optionally none at all) will be applied to boom 100. This fact provides an important advantage to boom 100 as compared to prior art booms, which typically transported considerable distances, often in rough water conditions, before they can be brought to bear in controlling a spill. Consequently, such prior art booms must be strong enough to stand up under the high tensions and pressures exerted by the towing process, potentially in rough seas. Consequently such prior art booms must be strong, and consequently must be constructed of strong and resistant materials. Such materials are relatively bulky, heavy, and expensive. In contrast, boom 100, optionally does not need to be towed but rather may optionally be laid, at a speed close or equal to speed of the deployment vessel, relatively gently in the water. Consequently boom 100 may optionally be constructed of materials only as strong as required for this purpose, and which may consequently be lighter and/or less bulky and/or less expensive than materials required to form the towed booms of prior art.

An exemplary material optionally useable to construct boom 100 is "TPU 1001" manufactured and sold by Erez Thermoplastics Ltd., of Kibboutz Erez, Israel. Here are some exemplary specifications: a fabric "PA 210 Den", polymer: TPU, total weight A STM D 751 ad 8 oz/yd$^2$, breaking strength (strip) A STM D 751 procedure E at 100/120 lbs/inch, 59" wide. A similar fabric described in metric terms: "PA 235 Dtx", also TPU, weight 273 gr/m$^{2'}$ breaking strength 90/110 Kg/5 cm, width 150 cm. An exemplary embodiment designed with this material in mind is expected to present an overall tension strength of 1500-2000 Kg. Other embodiments may provide tension strengths of 200-5000 Kg. Optionally, additional materials such as Kevlar, wire reinforcements, and fibers of various sorts may be added.

Optionally, a sleeve 101 (for example a sleeve 101 using this exemplary material) may be expected to resist extreme temperature changes, have high resistance to organic solvents and oils, to be easily visible from a distance, to be available and any desired length, to be easy to use in pairs of sleeves (see below), to be cost effective, to have low volume and low weight relative to sleeve length, and to provide good aerodynamic and hydrodynamic functioning. Optionally, sleeve material should optionally be UV resistant and able to stand up to waves as may be encountered in stormy conditions. Optionally, a biodegradable film may be used. Optionally a fire resistant material may be used to allow in-situ burning of the oil, a practice commonly used in oil spill response.

Optionally, boom 100 may be color coded in various ways. For example, in some embodiments boom 100 has alternating color units at regular distances, to facilitate estimating the length of the boom and/or circumference of a spill while viewing the boom from the air. In some embodiments a selected color designates portions of the boom which may be easily separated (i.e. connector sites), to facilitate opening and closing the deployed boom without damaging it, for example to allow a vessel (e.g. a vessel with equipment for treating or collecting spilled material) into the boom enclosure.

Optionally, boom 100 may be deployed with an oil-absorbing layer, an oil-degrading material, a chemical dispenser, and/or a biological dispenser.

Figure 8:
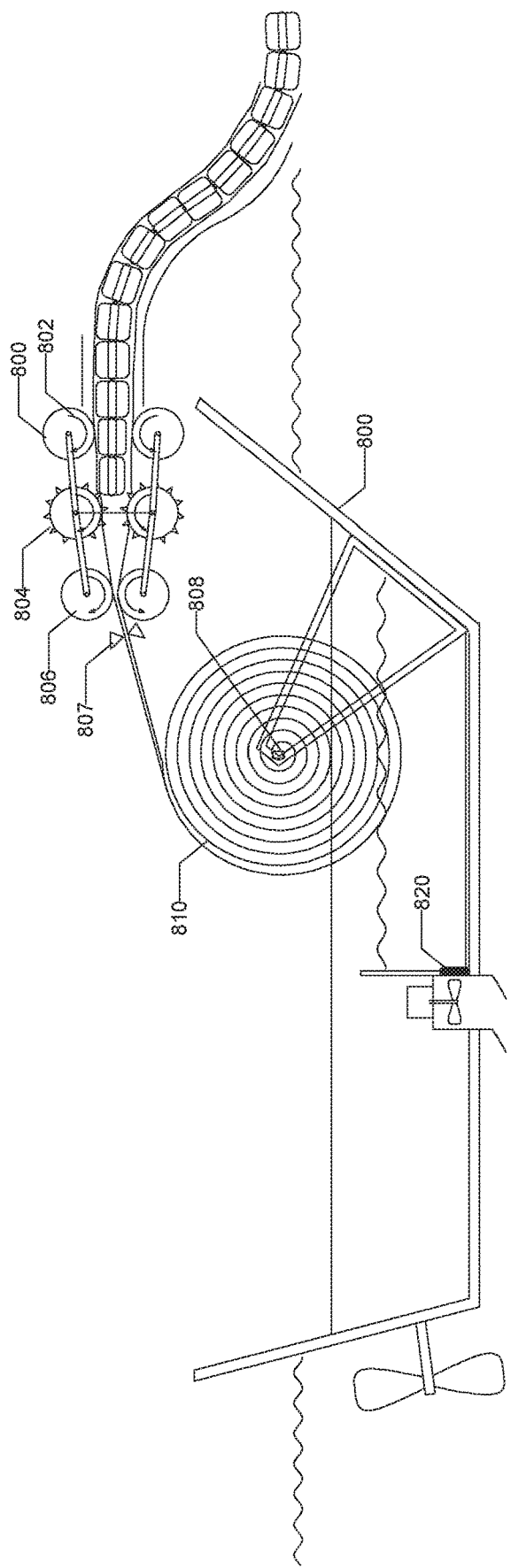

It is an additional advantage that boom 100, optionally constructed without wires and chains and other heavy and expensive components of booms of prior art, may economically be constructed and used on a one-time basis, and may be easily collected and/or shredded, for example using equipment presented in FIGS. 8 and 9. Alternatively, sleeve 100 may be constructed of a biodegradable material which slowly decomposes in water.

In some embodiments, boat controller 230 may also steer boat 200 under partial or complete automatic control. A sensor 222 may be provided to provide information as to the state of the water within in which boat 200 is advancing. In the figure sensor 222 is shown positioned as a camera or other monitoring/scanning sensor, however this positioning is optional and not limiting, sensor 222 may be any of a variety of sensor types positioned in or out of the water, and "sensor 222" may also be a combinations of sensors and/or a combination of sensor types.

In some embodiments, sensor 222 may indeed be a camera providing controller 230 with visual images of the water environment of the boat. Image interpretation software running in controller 230 may then interpret the images to detect (e.g. by color differences or texture differences) the edge of the spilled material. Additionally or alternatively, sensor 222 may also be a chemical sensor immersed in or floating on the water alongside boat 200, or may indeed be a plurality of sensors of same and/or different types, each supplying information usable by controller 230 to detect the edge of the spill and to direct boat 200 accordingly. In either case, controller 230 may use information from sensor 222 to calculate commands which steer boat 200 so that boat 200 (and consequently manufactured boom 100) passes just outside the outer edge of the spill, or at any other path deemed convenient or appropriate.

Module 99 optionally comprises a delivery module 350 operable to move or help move manufactured boom sections from boat 200 to the water. Delivery module 350 might, for example, simply be a funnel or guiding passage that enables depositing boom in the water beyond danger of contact with the boat propeller or steering system. Alternatively delivery module 350 may comprise a motor-driven conveyer, or any other tool convenient for manipulating and moving the boom being manufactured. As mentioned above, delivery module 350 may also comprise an inflation instigator 351 such as, for example, a hammer or other mechanism to break a barrier between binary gas-producing materials, thereby provoking inflation in a self-inflating flotation mechanism.

Figure 2:
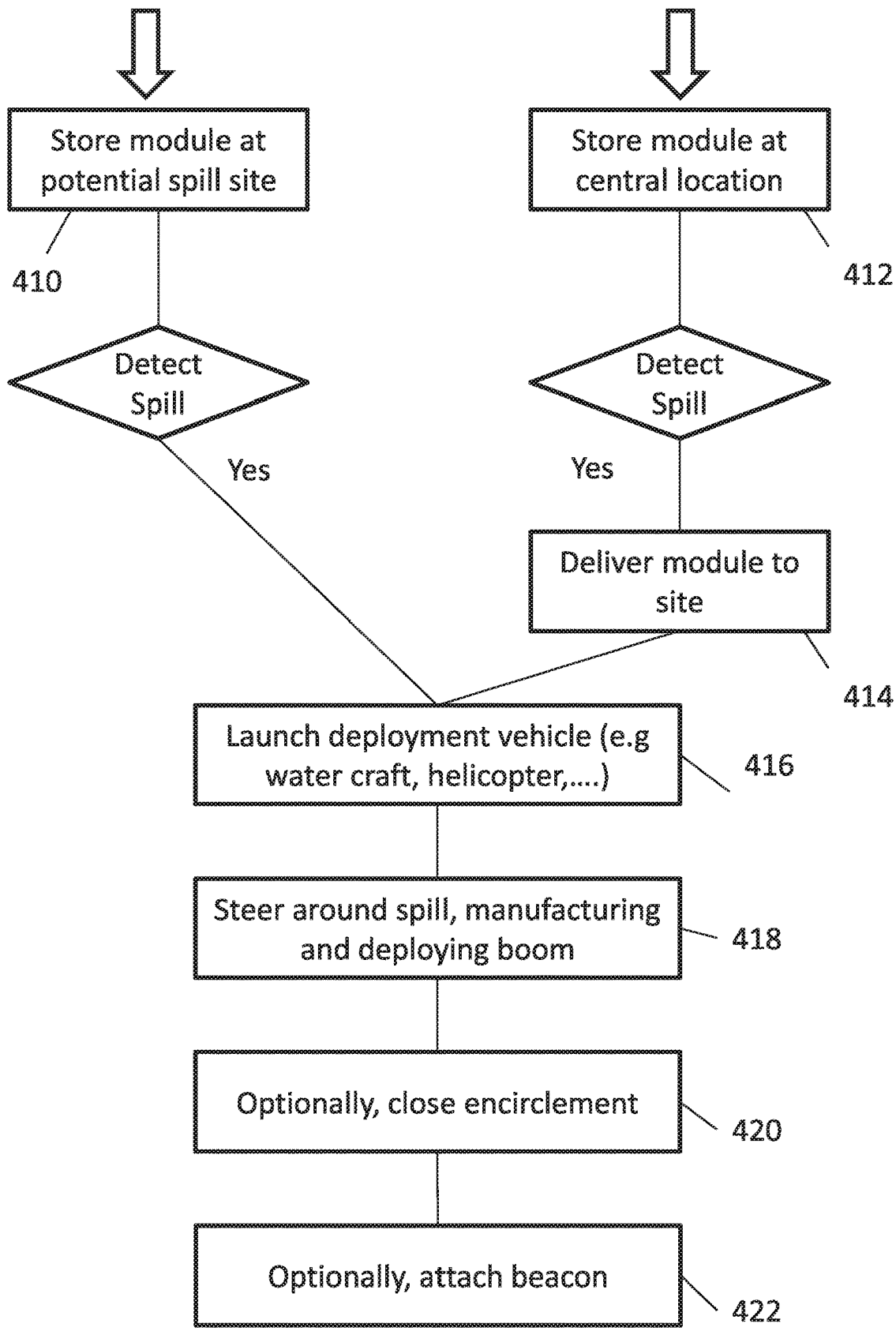
FIG. 2 is a flow chart presenting methods for containing a spilled floating material such as oil, according to some embodiments of the present invention.

FIG. 2 is a flowchart summarizing methods of using boom 100, according to some embodiments of the invention.

As shown in the figure at 410, a boom manufacturing module 99, optionally including some or all of a supply of sleeve 102 such as a reel 110, an inflation module 300, and a delivery module 350, being relatively inexpensive and not bulky as compared to booms in use today, may be stored locally, at potential spill sources. Alternatively, module 99 may be stored at a central storage site as shown at 412: the relative small size and light weight of module 99 components also make it practical to deliver it rapidly (e.g. by air, by speedboat) to the site of a detected spill, as shown at 414.

Module 99 may comprise a dedicated watercraft or other delivery vehicle (such as, for example, a helicopter), or alternatively, may be rapidly mounted on a delivery vehicle when a spill is detected. The delivery vehicle is then launched as shown at 416, and is steered (manually or automatically) around the spill site, as shown at 418, while manufacturing boom 100 by inflation (using pumped air or internal production of gas or other auto-inflation techniques to inflate flotation compartments 150, and by using pumped water or auto-inflation techniques to inflate compartments 160). In many cases it will be found useful to use boom 100 to completely encircle the spill or a portion of the spill, connecting one part of boom 100 to another part of boom 100 to form a ring 103 around the spill or part of the spill, as shown at 420. Optionally, the boom-encircled spill may be allowed to drift until recovery equipment is available, and optionally, as shown at 422, a beacon and/or transmitter 107 may be attached to boom 100 to facilitate locating it after it has drifted.

In some embodiments, in cases of discovery of an oil spill or the like from an oceangoing vessel in open water, or from a drilling platform, a deployment boat is lowered immediately and a boom is laid around the spill as rapidly as possible to avoid spreading of the spill. Deployment is preferably done in the direction of the current, however in the case of a fast current an alternative method may be employed, in which a boom may be deployed from a position towards which the current is moving the spill. If possible, the spill is surrounded by the boom, a navigational aid such as a beacon or transmitter is attached to the boom, and the boom is allowed to float freely.

In the case of a spill near shore or in harbor, additional booms may be positioned where they can protect the shore or other sensitive areas.

In the case of equipment being brought to collect the spill (e.g. by skimming) or to treat the spill by chemical or biological treatment, in some embodiments the boom is opened, a treating vessel is introduced into within an area enclosed by the boom, the boom is re-closed, and treatment is done inside the boom enclosure. Personnel of the treating vessels optionally move in concentric circles within the boom area, taking into account the current so as to avoid damaging the boom inadvertently.

Detail of Manufacturing Module 99

Figure 3:
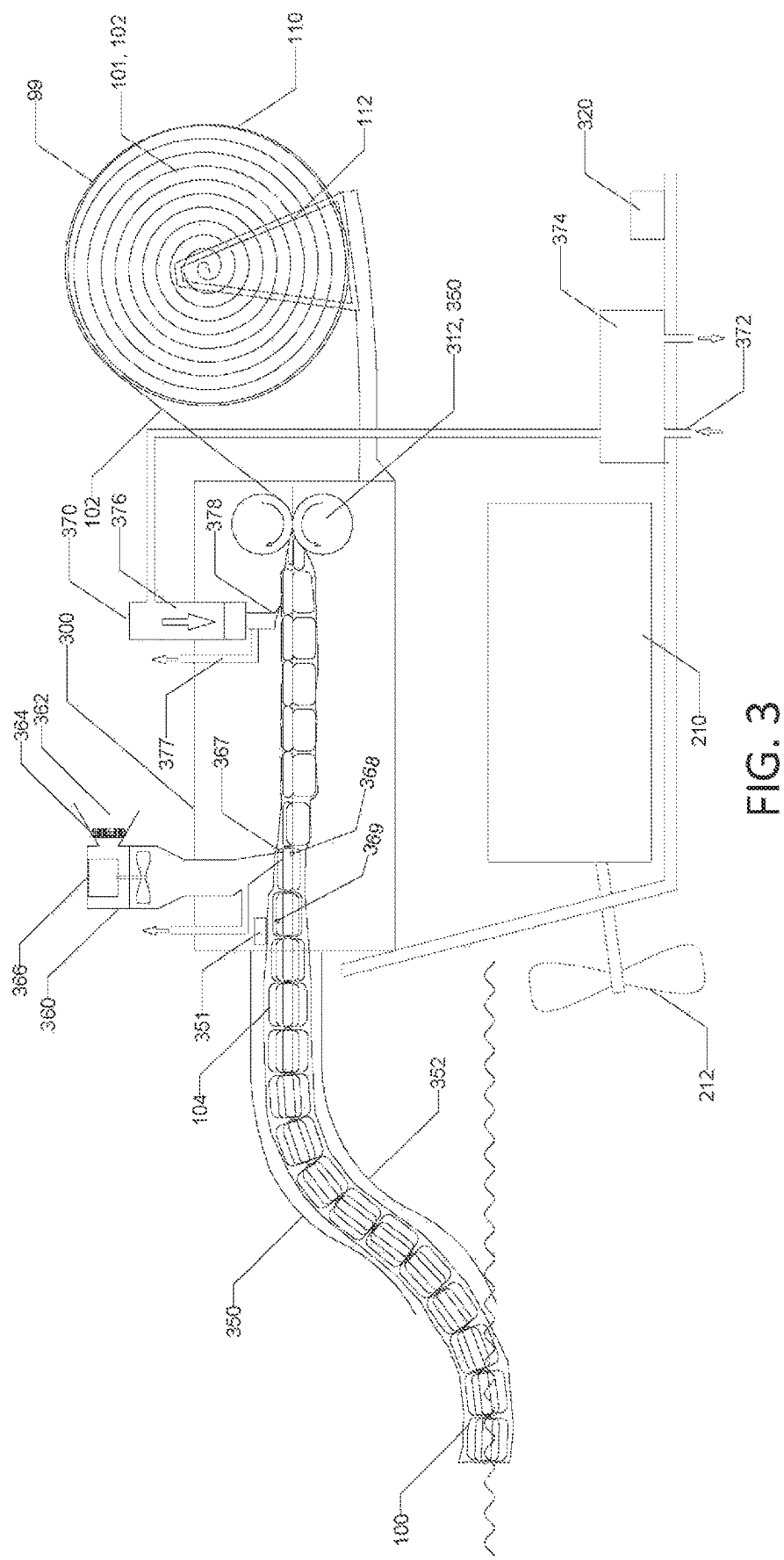
FIG. 3 is a simplified schematic of a detail of the manufacturing module shown in FIG. 1, according to some embodiments of the present invention.

Attention is now drawn to FIG. 3, which provides additional details of a portion of a manufacturing module 99, according to an exemplary embodiment of the invention.

FIG. 3 shows details of an inflation module 300 and delivery module 350 mounted on a boat 200.

As shown in the figure, a boom roll feeder 112 feeds sleeve 102 from reel 110 through puller wheels 312 and into inflation module 300. Inflation module 300 optionally comprises a water inflation module 370 and an air inflation module 360.

In this exemplary embodiment, air inflation module 360 comprises an air inlet 362, an air filter 364 and an air blower 366 for creating inflation air pressure, and one or more air injectors 367 for injecting air into flotation compartments 150, optionally through a one-way valve 369 in the compartment. Optionally, module 360 also comprises air pressure sensors or inflation pressure sensors 368 reporting to controller 230 and thereby enabling fine control of inflation pressures by controller 230 in some embodiments. Optionally, inflation pressures can be modified according to air temperature, sea condition, or other environmental and/or operational factors. Optionally, inflation pressures may be controlled on a per-compartment basis, for example to provide controlled degrees of inflation for selected compartments, in order to influence the geometry of the resulting boom. This process will be discussed in further detail below.

In an exemplary embodiment, water inflation module 370 comprises a water inlet 372, a sea water filter 374, pump 376, water relief valve 377, and water injector 378, which injects water into water compartments 160, optionally through one-way valves 379 in compartments 160.

Delivery module 350, in this exemplary embodiment, comprises puller wheels 312 which impart movement to the sleeve during manufacture of boom 100, a funnel or guide 352 which prevents boom 100 from touching the boat's propeller or steering mechanisms, and optionally additional movement-imparting levers or wheels which facilitate moving manufactured portions of boom 100 towards the water.

As stated above, sensors or control elements reporting to controller 230 may report speed of the delivery vehicle 200 through the water and/or speed of manufacture of the boom. In some embodiments controller 230 uses this information to calculate commands (e.g. to boat motor, to modules 300 and/or 350) to coordinate these two speeds with each other, so that the process of deploying the boom leaves the boom sections in their desired positions, and little additional stress (e.g. towing stresses) is imparted to the boom as it reaches the water.

An exemplary embodiment of a boom 100 and a module for deploying it are described in the next two paragraphs. It is to be noted that the figures given are exemplary only, and not limiting. Where ranges are given, these too are exemplary and not limiting. The information is provided as a description of a currently planned embodiment expected to be useful for certain applications.

According to an exemplary embodiment, a boom 100 may be 200-500 mm high and 250-350 mm wide when deployed. Empty weigh of sleeve 102 may be 140-450 g per meter. The same boom portion, when injected with water, may weigh between 2000-6000 g per meter. An exemplary reel of sleeve 100 may be 150-200 M in length and weigh 30-90 Kg, with a cartridge diameter of 0.7-0.9 m and a width of 0.3-0.45 m. As may be seen, these values, while not limiting, are indicative of the availability and adaptability of embodiments here described: components such as these can indeed be stored on site, and handled quickly by a small team (e.g. 2 people) operating in a small boat (e.g. a 10 m craft). Shelf life of such a sleeve may be 4-10 years, if stored protected and isolated from the external environment. Speed of manufacture (inflation and delivery) of boom 100 may be as fast as 10, or 15, or 20, or 30, or even 40 m per minute or more, depending on the speed and quality of the inflation and delivery modules used. Such a boom, if stored on site and used as soon as a spill is detected, may indeed, in many situations, be able to encircle and entirely contain a spill within 10 or 15 or 20 or 30 or 60 minutes from detection of the spill.

An exemplary embodiment of a module 99 for deploying the boom 100 described in the preceding paragraph may be as small as 1 m×0.5 m×0.5 m. A funnel 352 as shown in FIG. 3 might be 1-1.5 m long. The whole module, minus the sleeve reel, might weigh 50-250 Kg. In some embodiments, a reel of boom sleeve material and the modules required to inflate and deploy it, capable of deploying a 200 meter boom, may be contained in a space smaller than 2 cubic meters.

Optionally, the module might be designed to work with 12V or 24V power sources, so as to be compatible with power sources conveniently available in a small watercraft.

Figure 4:
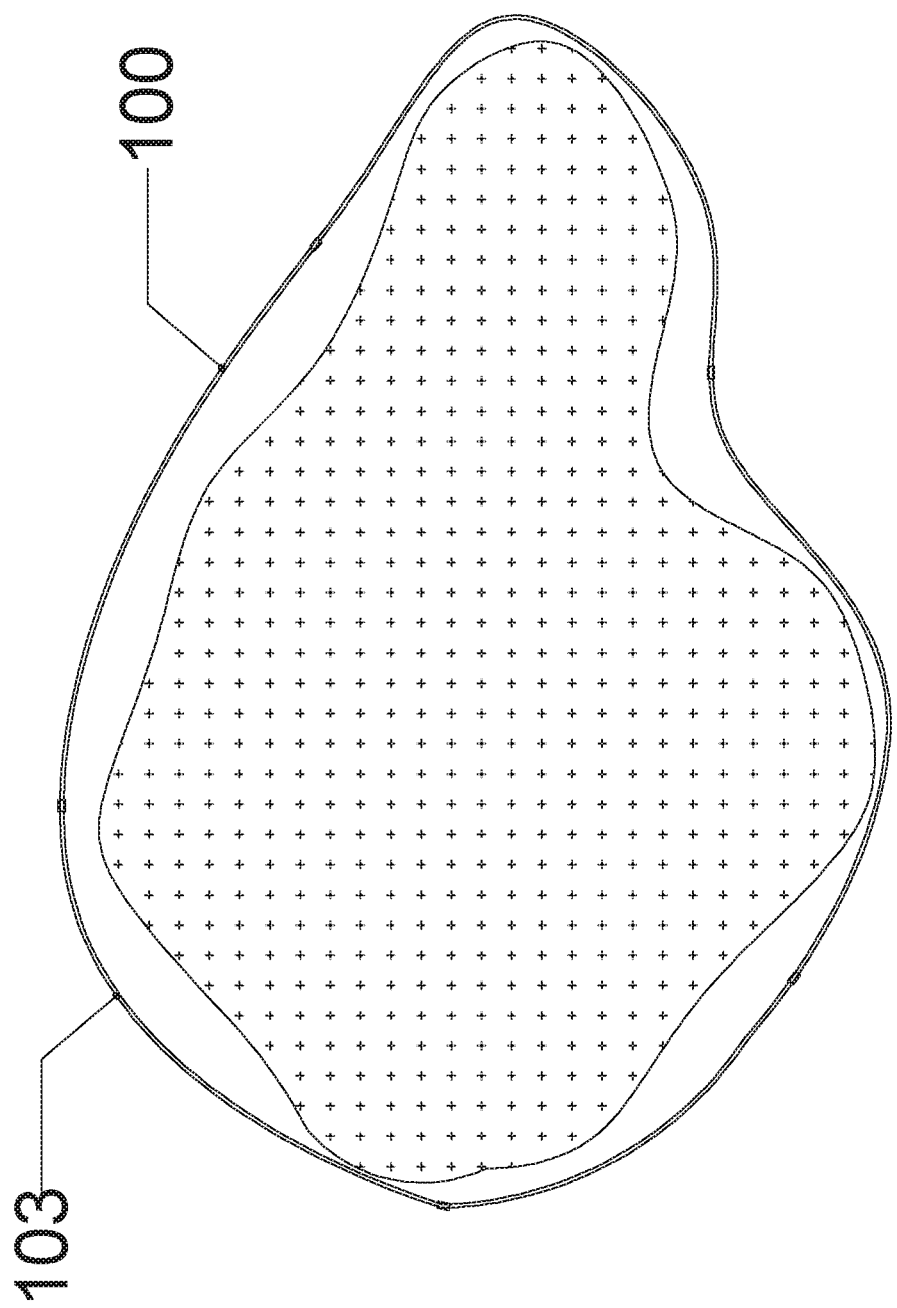
FIG. 4 is simplified drawing of a use for a boom, according to some embodiments of the present invention.

Attention is now drawn to FIG. 4, which is a simplified view of an optional use of boom 100, according to some embodiments of the present invention.

Prior art booms are often towed after encountering the spill, sometimes as a way of attempting to gather up widely spread spilled material. Since in many circumstances boom 100 may be rapidly deployed after a spill (for reasons discussed above), it may in some cases be possible to entirely contain the spilled material in an encircling boom. Therefore in some circumstances, and according to an optional method of use according to some embodiments, boat 200 and module 99 are used to construct a boom 100 around all of a spill or around a portion of a spill. Optionally, two boom portions (for example an early-manufactured segment and a late manufactured segment, or for example first and last manufactured portions of a boom) are connected to each other to complete and close an encircling ring of boom 100, thereby forming a ring 103, as shown in FIG. 4.

In some embodiments, a ring 103 formed by boom 100 around all or part of the spill may be allowed to float freely away from the spill site. In other words, according to this optional embodiment, ring 103 is subject to the action of wind and current and wave, just as the spill itself is subject to those influences. In many circumstances, in a spill from a drilling platform far from land, for example, the spill and its containing ring 103 may be allowed to drift for a time, until equipment needed to recover or treat the spilled material can be brought to bear. Optionally, one or more beacons (and/or transmitters) 107 may be attached to boom 100 (ring 103) to facilitate locating the drifting spill containment, even in conditions of darkness and/or fog.

This method of using boom 100 further optionally enables boom 100 to be constructed in a manner which is smaller, lighter, and optionally less sturdy than prior art booms which are often attached to objects or towed through the water, and therefore must be sufficiently robust to resist the resultant tensions, and sufficiently large to block spilled material which is subject to contrary winds and currents. Ring 103, according to this optional embodiment, flows with the wind and current, rather than having to hold the spilled material against them. Therefore boom 100 may be effective despite lighter and optionally less sturdy construction and smaller sizes as compared to booms of prior art, which are typically designed to be attached and/or towed when in contact with the spill, and therefore must be sufficiently tall and deep to resist passage of spilled material which must be held against the wind and against counter-currents (currents in the water and/or currents generated by towing). Note, however, that this 'free floating' use of boom 100 is optional. Some embodiments may be constructed as described in this paragraph to take advantage of that 'free floating' expected use, yet other embodiments may be constructed to be attached or even to be towed.

Attention is now drawn to FIGS. 5A-5B, which present a stabilization concept used in some embodiments of the present invention.

In some embodiments, boom 100 comprises a flotation component 150 and a water filled or partially filled component 160, as discussed above. It is a useful characteristic of some embodiments of boom 100 that sleeve 101 of which they are constructed, after inflation, contains no significant amounts (e.g. not more than 1% by volume) of ballast material heavier than water. An advantage of such a boom is that no heavy ballast material need be stored, formed, transported, deployed, and eventually recuperated, making the deployment process of boom 100 relatively faster, simpler, and cheaper than it would be if heavy ballast material were used.

Classical booms used to contain oil spills comprise a flotation chamber floating on the water, and, depending from it, a ballast heavier than water. Such an arrangement tends to have a vertical orientation in the water, with the flotation element pulling up and the heavy ballast pulling down.

In some embodiments of boom 100, however, nothing heavier than (i.e. more dense than) water is contained in compartments 160, which are consequently not significantly heavier than water. Accordingly, hydrodynamic stabilization of the deployed boom must be achieved using only a gas-inflated flotation element and a water-inflated compartment depending from it. FIGS. 5A-5B explain how this is done.

FIG. 5A presents a cross-sectional view of a boom 100 which comprises a flotation compartment 150 and a water compartment 160. Flotation compartment 150 is wider than it is deep, optionally at least 1.25 times wider, optionally at least 1.5 times wider, and optionally at least twice or three or four or five times as wide. As may be well understood from basic physical principles, hydrodynamic forces will tend to push such a flotation chamber to a position in which flotation compartment 150 is approximately parallel to the water surface.

FIG. 5B shows, for example, a water current tending to push compartment 160 sideways, and thereby causing boom 100 to rotate. (Wind pressure moving from right to left on the figure would have a similar rotational effect.) However, in some embodiments of boom 100, water compartment(s) 160 have at least a semi-rigid relationship to flotation compartments 150. In the embodiment shown in FIGS. 5A and 5B, compartments 150 and 160 are approximately perpendicular to each other. In some embodiments, compartments 150 and 160 are within 20° of being perpendicular. In some embodiments compartments 150 and 160 are within 10° of being perpendicular. In some embodiments compartments 150 and 160 are within 30° of being perpendicular. Methods for creating this perpendicular orientation are discussed with reference to FIGS. 5C and 5D below.

In contrast to prior art booms using heavy ballast (e.g. metal chains), the weight of compartment 160, filled with water, does not strongly contribute to vertically orienting this embodiment of boom 100. However, the weight of water contained in portion 160 does resist wind forces that might otherwise tend to lift flotation element 150 out of the water. Since flotation element 150 is pulled into the water by the weight of compartment 160, hydrodynamic forces (as seen in FIG. 5B) will tend to keep flotation element 150 parallel to the water surface. Consequently, with portion 160 connected so as to be perpendicular to flotation element 150, these same hydrodynamic forces tend to force portion 160 into a position roughly perpendicular to the surface of the water, as is appropriate for containing an oil spill and for preventing a phenomenon called "entrainment" in the oil spill industry, where oil may pass under a boom in turbulent water conditions which push the descending part of the boom sideways, enabling spilled material to pass under the boom.

Attention is now drawn to FIGS. 5C and 5D, which show methods of interleaving a plurality of sleeves to create a boom 100, according to some embodiments of the invention.

According to some embodiments, a method for constructing boom 100 comprises providing a plurality of sleeves optionally each comprising inflatable and/or fillable compartments, and interleaving portions of two or more sleeves (for example, by passing an extension of one sleeve through an opening in another sleeve) prior to inflating and filling compartments of the sleeves (or, optionally, prior to completing filling and inflation of the compartments). In some embodiments, pressures induced by filling and inflating hold the interleaved sleeves in at least a semi-rigid geometrical relationship one to another. In an embodiment shown in FIG. 5C, a segment of a first sleeve interleaves with a plurality of segments of a second sleeve. In an embodiment shown in FIG. 5D, a segment of a first sleeve interleaves with a single segment of a second sleeve. In some embodiments, methods shown in FIG. 5C and methods shown in FIG. 5D may be combined in a same boom 100. In some embodiments, segments (containing inflatable compartments) are approximately of same length in two interleaving sleeves. In alternative embodiments segments (in different sleeves or in a same sleeve) may be of different sizes. In some embodiments, three or more sleeves may be interleaved. In some embodiments, inflation and filling of compartments of interleaved sleeves locks the sleeves together in a semi-rigid geometrical configuration.

FIG. 5D shows components for comprising two segments of a boom 100 constructed from portions of two sleeves. A sleeve 151 comprising air compartments 150 (for example, 150A and 150B), interleaves with a sleeve 161 comprising water compartments 160 (for examples, 160A and 160B). In this exemplary embodiment each segment 140 of sleeve 151 comprises a segment from sleeve 151 comprising a pair of gas-inflatable compartments 150 from sleeve 151 (e.g. the compartments labeled 150A and 150B in the figure), connecting straps or surfaces 152 connecting 150A to 150B, an open space 153 between 150A to 150B and connecting surfaces 152, and (optionally flexible) surfaces 154 connecting segment to segment; and a segment from sleeve 161 comprising a pair of water compartments 160 from sleeve 161 (labeled 160A and 160B in the figure, with connecting straps or surface 162 connecting 160A and 160B, and an optionally flexible surface 164 for connecting between segments.

During manufacture, inflation module 300 and/or delivery module 350 slides upper compartments 160A through space 153, so that sleeves 151 and 161 are interleaved. Compartments 150 and 160 are then inflated. Compartment sizes are so calculated that interleaving is possible with the compartments uninflated or only partially inflated, but once all or most of the compartments are inflated either with water or with air or with a mixture of water and air, the interleaved segments are fixed together by inflation pressures from both flotation and water compartments, which are pushed up against each other by the forces of inflation. Therefore, in addition to filling the flotation and water compartments, the inflation process as two effects: 1) it links the two interleaved sleeve elements so that they cannot be pulled apart while inflation is maintained, and 2) the inflation pressures tend to maintain the interleaved elements in at least a semi-rigid geometrical relationship to one another. So for example, in some embodiments, the shape of the interleaving portions of sleeves 161 and 151 and/or control of the inflation process to produce a desired amount of pressure in each of the several interleaving inflatable compartments, separately and/or together produce a fixed geometrical relationship between compartments of sleeves 151 and 161 when inflated. In some embodiments, the sleeves are held perpendicular to each other. Other optional positional relationships between the parts are shown in FIGS. 6A-6F and discussed below.

It is noted that the method for achieving a perpendicular relationship between flotation compartments 150 and water compartments 160 described in FIG. 5D and discussed above is optional. Some embodiments may use straps or attachments or any other method for attaching two sleeves or for creating a pre-formed sleeve with separate compartments at pre-determined angles.

Surfaces 154 and 164 together comprise joining areas 142, which (optionally flexibly) join segments 140 one to another.

FIG. 5C is similar to FIG. 5D, with a principle difference that open area 153, for receiving insertion of a portion 160A from sleeve 161, is positioned between two segments (i.e. between two inflatable lengthwise portions) of sleeve 151, whereas in FIG. 5D, open area 153 is positioned within a single segment of sleeve 151. Therefore, FIG. 5C shows an exemplary embodiment in which a segment of a first sleeve interleaves with a two segments of a second sleeve, and FIG. 5D shows an exemplary embodiment in which a segment of a first sleeve interleaves with a single segment of a second sleeve.

Attention is now drawn to FIGS. 6A-6F, which show simplified schematics of a plurality of optional configurations for boom 100, according to some embodiments of the present invention. The designs shown in FIGS. 6A-6F can optionally be implemented using the sleeve interleaving process explained above with reference to FIG. 5C. Alternatively, any other method of attaching sleeves and/or of producing a complex sleeve with a determined form and a plurality of internal compartments may be used to produce configurations similar to those shown in FIGS. 6A-6F. It is to be understood that these configuration are exemplary and not limiting: other numbers of combined compartments and other forms of combining compartments may be used as well.

FIG. 6A is a simplified schematic of a boom 100 which may result from the sleeve combining operation described above with reference to FIG. 5C or 5D. A "cross" shape results, with flotation compartments 150A and 150B forming 'arms' of the cross, compartment 160B depending therefrom. FIG. 6A presents an additional interesting feature: the embodiment shown there, called embodiment 100A, comprises a water compartment (or a portion of a water compartment) labeled 160A, wherein, after inflation, a portion of water is maintained above the water level of the ambient water when boom 100A is deployed. This "water above water" configuration has the advantage of adding stability to boom 100a in several respects. Maintaining some water above the ambient water level has the effect of forcing the flotation compartments lower in the water. This is similar to the effect that would be obtained were compartment 160 filled with a ballast material heavier than water, yet with the arrangement shown in FIG. 6A, no heavy ballast material is required. An advantage of forcing flotation compartment 150 into the water is to lower the aerodynamic profile of boom 100A, thereby making it less subject to movement by wind, and less subject to tipping or rotating under the effect of wind.

'Water above water' configurations optionally comprise a separated compartment at least partially supported above ambient water level and at least partially filled with water and/or a water compartment 160 which extends both below ambient water level and above ambient water level, as shown in FIG. 6A. In other words, referring to FIG. 6A as an example, compartments 160A and 160B may be separated compartments or a common compartment, and may be fully filled with water or may be partially filled with water and partially with gas. Ordinarily, positioning a weight such as a water compartment above the water level might be expected to reduce stability of the structure, but positioning it above the central axis of the boom configuration tends to solve this problem, and forcing the boom into the water enhances overall stability when wind effects are taken into account. Optionally, a similar effect may be achieved by introducing some water into a flotation compartment 150. Optionally, wind and water conditions at the time of deployment may be taken into account in selecting boom shapes and/or inflation and filling patterns to be used.

FIG. 6E shows a configuration similar to that of boom 100A, and labeled 100E. Configuration 100E differs from 100A in that the 'arms' formed by compartments 150a and 150b are angled downwards, so that the distal ends of these arms are forced to be lower in the water than is the central crossing point where (if used) sleeve interleaving takes place. Configuration 100E, like configuration 100B, may present an aerodynamic advantage over configuration 100A, in that the tips of the 'arms' formed by the flotation compartments will be, in many circumstances, under water. This fact minimizes the likelihood that a strong wind might pass under the flotation compartment and exert a strong rotational force, rotating the boom and thereby perhaps facilitating passage of oil over or under the boom. If the ends of the 'arms' are forced into the water, this possible rotational effect due to strong wind may be less likely to occur. Accordingly, configurations 100B and 100E might be preferred when a boom is deployed under strong wind conditions. Arms comprising flotation compartments 150 may also be formed with a downward curvature, to produce a similar effect.

Note that since it is the mutual pressure exerted on compartments 150 and 160 on each other when inflated that maintains their geometrical positional relationship, variations in inflation pressures may optionally be used to vary the positions the compartments take one with respect to another. For example, if the sleeve material is to some extent expandable and compartment 160A is inflated to a higher pressure than 160B, then the effect of that overpressuring of the higher compartment 160 will have the effect of pressing compartments 150 downward, as shown in FIG. 6E. Accordingly, the downward angle of the arms formed by compartments 150 may be determined at the time of boom inflation by controlled differential inflation of individual compartments, and may be controlled by controller 230 or by an operator of module 350, with the downward angle being selected in view of prevailing wind and water conditions.

FIG. 6F presents a configuration 100F similar to that of FIG. 6E, with a difference that its "water above water" compartment 160A, while being maintained above the ambient water level, is nevertheless lower than the upper level of flotation chambers 150, helping to keep a low center of gravity.

Attention is now drawn to FIG. 6D, which presents a boom configuration labeled 100D, and which might be termed a 'fat boy' boom. As may be seen in the figure, the upper and lower compartments 160 are given a somewhat rounded shape. An advantage of this shape is that external 'trap' areas, presenting acute angles, are created at positions labeled 171 and 172 in the figure. Trap 171 will tend to catch and force downwards droplets of oil splashed by waves and tending to wash over the top of boom 100D. Trap positions labeled 172 will tend to reduce an effect known in the industry as entrainment. Similarly, portions of spill material driven by wave action or currents up against lower portion 160B will similarly encounter an acute angle which resists its passage beyond boom 100D.

Attention is now drawn to FIGS. 6B and 6C, presenting what might be called a "butterfly" configuration labeled 100B. Configuration 100B also presents acute angles at positions 171 and 172, helping to block spill material and preventing their being washed over or under boom 100B because of the actions of wind, wave, and/or current. Configuration 100B also has the advantage that even under conditions when boom 100B has momentarily been partially rotated, there will still be an 'arm' (160A1 or 160A2) of the boom extending into the air in a near-vertical orientation, and a 'leg' of the boom (160B1 or 160B2) extending into the water in a near-vertical orientation. Butterfly boom 100B may be constructed, for example, by using the interleaving technique described with respect to FIGS. 5C and 5D, using two sleeves 161 interleaved with one sleeve 151, to produce the butterfly effect.

FIGS. 6B and 6C together show that the degree of inflation of upper compartments 160A1 and 160A2 in comparison with the inflation of lower portions 160B1 and 160B2 can be used to control a downward-pointing angle on arms 150. The two figures show a same configuration, differing only in that compartments 160A1 and 160A2 are more highly inflated in FIG. 6B than they are in FIG. 6C. (Note that a sleeve 101 having compartments made of slightly expandable material may be required to use this effect.)

Attention is now drawn to FIGS. 7A-7C, which show an optional device and method for connecting boom sleeves one to another, according to some embodiments of the present invention.

If boom sleeves 101 are supplied as reels 110 or in a similar manner, it will sometimes be desirable to create a boom longer than the sleeve provided in a single reel. Accordingly, in some embodiments, the ends of a sleeve 101 may be provided with connectors for connecting one sleeve to another. FIGS. 7A-7C show an exemplary embodiment of such a connector. FIG. 7A shows a sleeve reel 110 in the process of being used to manufacture a boom, being pulled towards and into module 300 and/or module 350. At the center of reel 110 an end of sleeve 101 is attached to a connector 180. Connector 180 is optionally made of light weight plastic material and attached to the boom using one-way snap and puncturing the boom's material while closing together. Provision may be made for shortening the 'lead' (uninflated sleeve space leading up to connectors 180), once connectors 180 are snapped together.

Modules 300/350 may be equipped to recognize when reel 110 reaches its end, whether by optical scanning of a code printed on the sleeve material, or by pressure detected by a sensor when connector 180 tries to pass into module 300/350, or by any similar means. On detection of the end of a reel, boom inflation is stopped, a new reel may be mounted, and the 'inside' end of the sleeve of the old reel may be connected to the 'outside' end of the new reel, as shown in FIG. 7C. Note that in the exemplary embodiment shown in the figure, connector 180 comprises a 'female' component 182 sized and shaped to receive and optionally to lock onto a 'male' component 181. Optionally, the male component will be the 'outside' connector and the female component the 'inside' connector, or vice versa, with consistency being maintained among reels, for compatibility. It is to be understood that the details of connector 180 presented in the figure and in this paragraph are exemplary and not limiting.

Attention is now drawn to FIGS. 8 and 9, which demonstrate a further advantage of boom 100 over devices and methods of prior art. When a boom comprises heavy, bulky, and/or expensive components, recovery of the boom is desirable, yet necessitates significant work and expense above and beyond the work and expense of using the boom to contain an oil spill and that involved in collecting or treating the trapped spilled material.

In contrast, boom 100 optionally contains no material heavier than water (other than, optionally, the sleeve material itself) and no material expensive enough to require maintaining the boom, cleaning it, and re-transporting it to its storage facility. Boom 100, when no longer needed to contain spilled material, may simply be collected and its material recycled or otherwise disposed of.

FIG. 8 presents a collection module 800 for collecting (and optional eventual recycling) of boom 100. In this optional embodiment, a motor 808 powers pulling wheels (or the equivalent) for pulling in barrier 100. Barbed wheels 804 (or the equivalent) puncture compartments 150 and 160 of boom 100, letting out the contained air (or gas) and water, allowing the remaining sleeve 101 to be pressed between guiding wheels 806 which squeeze out gas, water, and residual oil or other spilled material. Optional scrapers 807 may be used to scrape spill material from the surface of the compressed sleeve 101, which may then be reeled onto a reel 810, which may be somewhat similar in size to the reel 110 containing the original sleeve. Using (at label 820) filtration, centrifuging, skimming, and other techniques, residual spilled oil may be collected and cleaned water may be returned to the environment. Optionally, facilities may be provided for offloading spilled material collected from the boom at this time.

It is noteworthy that the machines and physical arrangements required for collection module 800 bear a certain similarity to those used by module 99 for inflating and deploying boom 100. Accordingly, in some embodiments, a combined module may be used, in which facilities for inflating (or controlling self-inflation of) boom 100 and for deploying boom 100, and facilities for collecting boom 100 after use, may be mounted on a same watercraft and used, each module, when appropriate. In such a combined module common objects such as motors, controllers, reel handlers, on-loading and off-loading devices (e.g. 350) and other common tools and materials may of course be used in both deployment and collection contexts.

FIG. 9 presents an alternative to the reel collection arrangement shown in FIG. 8. In FIG. 9, a shredder wheel combination 900 (or the equivalent) may be used in place of the reel collector 810 for collecting used boom 100. In some embodiments, shredder wheels 900 are used to shred sleeve 101 once it has been emptied (and optionally cleaned of spill material) and the shredded pieces of sleeve 101 can then be stored in an arbitrarily shaped space until delivered for recycling or other disposal.

It is noted that it is an advantage of boom 100 that clean water and chemical treatments may optionally not be used to clean boom 100 after use (as is typically done with re-useable prior art booms). Since the volume of boom 100, when deflated and compressed, is relatively very small, simply discarding the contaminated boom sleeve is an option.

It is noted that as an optional enhancement, boom 100 may be provided with and/or deployed with an oil absorbing layer (such layers are known in the art) to at least partially absorb oil which touches boom 100.). The machine will deploy them together.

Figure 10A:
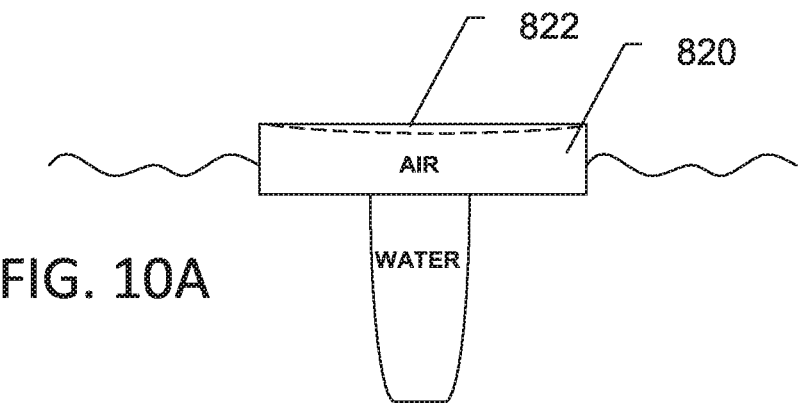
FIGS. 10A and 10B are simplified cross-sections of additional optional boom designs, according to some embodiments of the present invention.
Figure 10B:
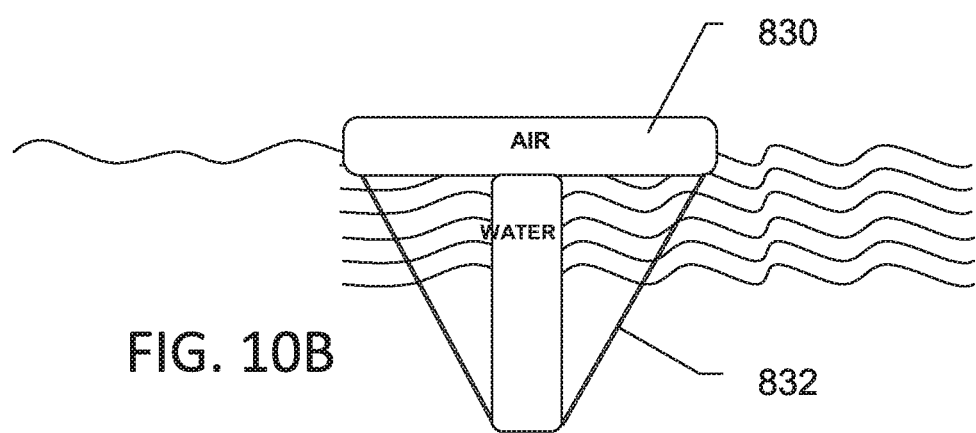

Attention is now drawn to FIGS. 10A and 10B, which are simplified cross-sections of additional optional boom designs, according to some embodiments of the present invention.

FIG. 10A shows a boom design in which a broad and relatively flat flotation compartment 820, from which depends a water compartment, is formed with a hollow 822 as shown in the figure, so as to create a lowered and less aerodynamic profile.

FIG. 10B shows an embodiment in which an approximately perpendicular geometric relationship between a floating compartment 830 and a water compartment pendent therefrom is maintained by straps or attachments 832.

Figure 11A:
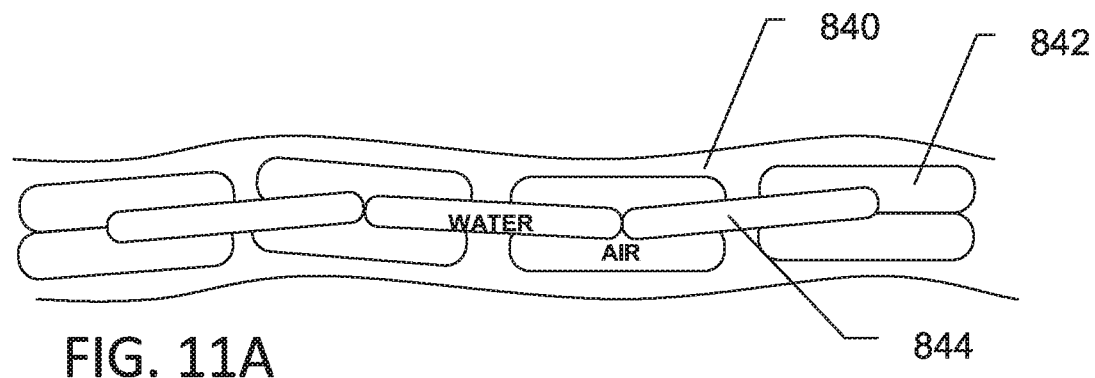
FIGS. 11A-11F are simplified views of a boom deployed in wavy water, according to some embodiments of the present invention.
Figure 11B:
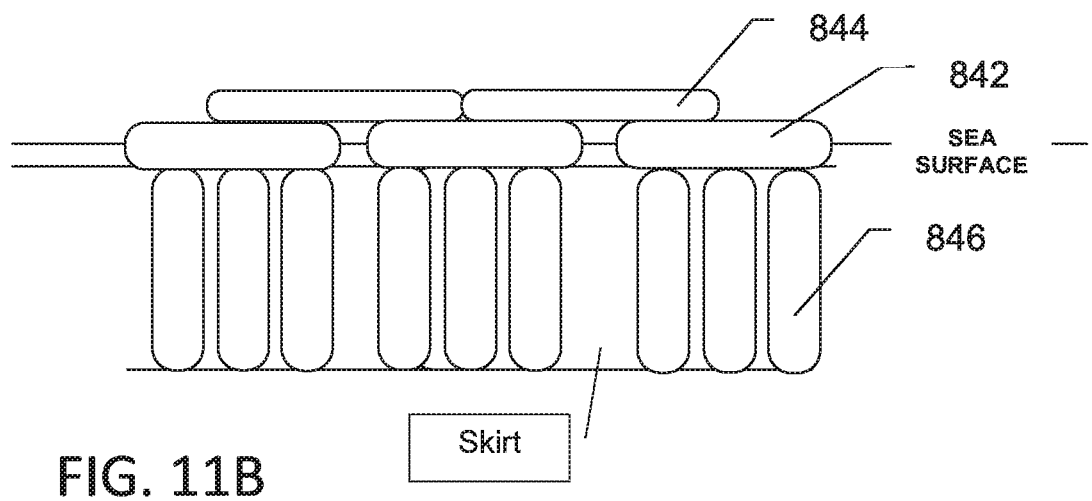
Figure 11C:
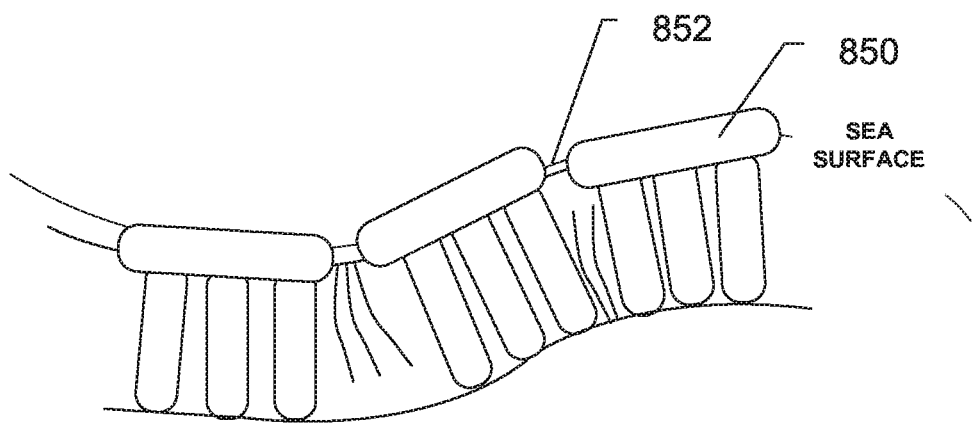

Attention is now drawn to FIGS. 11A-11F, which are simplified views booms deployed in wavy water, according to some embodiments of the present invention. FIGS. 11A and 11B show top and side views of a boom comprising water compartments 846, flotation compartments 842, and 'water above water' compartments 844. Also shown is a 'skirt' of material connecting water compartments 846 and extending the barrier they create. FIG. 11C shows the behavior of this boom in a wavy sea environment, where flexibility provided by inter-segment connecting regions 852 provide flexibility enabling the boom to adapt to the surface of the water.

Figure 11D:
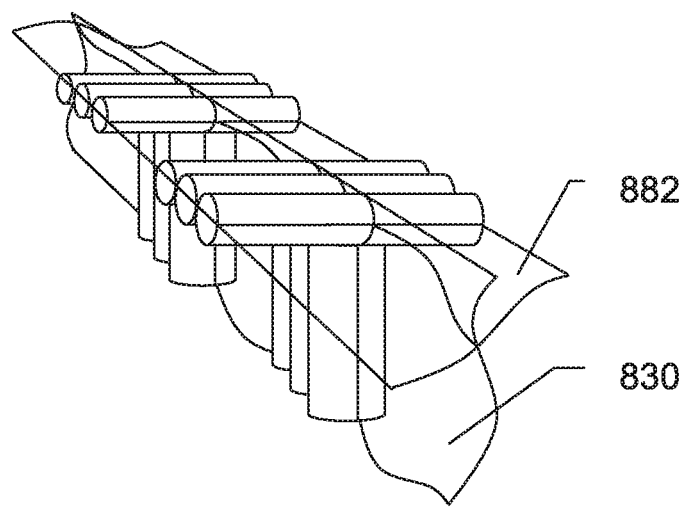

FIG. 11D shows a boom in which a vertical 'skirt' 830, containing and connecting water compartments and a similar material flap 882 containing and connecting flotation compartments may be provided, skirt 830 and flap 882 helping to prevent passage of spilled material across the boom barrier in wavy and windy conditions.

Figure 11E:
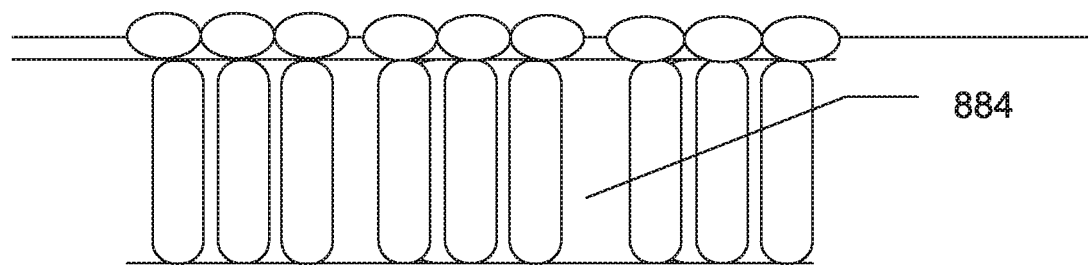
Figure 11F:
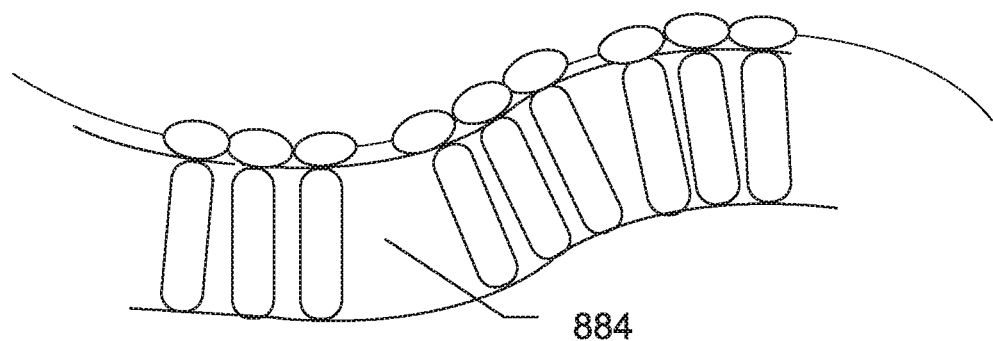

FIG. 11E shows a boom comprising flotation compartments and pending water compartments in still water. FIG. 11F shows the same boom in wavy water.

Figure 12A:
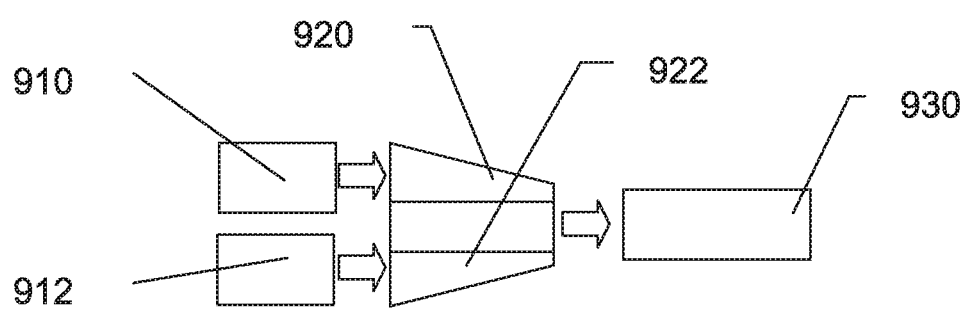
FIGS. 12A and 12B are simplified views of a machine for creating a boom based on extruded foam, and a barrier so constituted, respectively, according to some embodiments of the present invention.
Figure 12B:
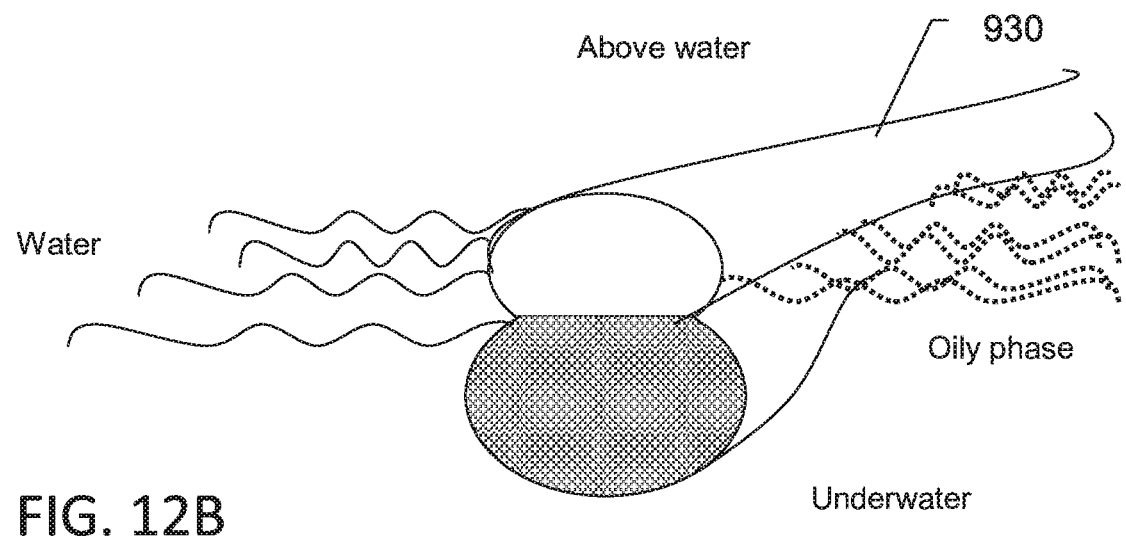

FIG. 12A shows a simplified view of a machine for creating a boom comprising extruded foam, and FIG. 12B shows such a boom, according to some embodiments of the present invention.

FIG. 12A shows a container 910 for ingredients required to create a closed-cell foam, and a container 912 for ingredients required to create an open-cell foam. Extruder 920 prepares closed cell foam and extruder 922 prepares open cell foam, and both types of foam are joined together by the extrusion process. The result is a foam boom 930 shown in greater detail n FIG. 12B. The closed cell portions of boom 930 contain air, and comprise a flotation element for boom 930. Open cell elements of boom 930 absorb water, become relatively heavy, and constitute the underwater extension of boom 930.

The following is a further additional description of some embodiments of the present invention:

Method, Device and System for Containment of Spills in a body of water and a Method, Device and System for producing and/or deploying the Containment mechanism:

According to some embodiments of this invention spreading of marine spills may be blocked and/or leaks may be contained. Marin spills/leaks may include oil or chemical or any other liquid surface spill including biological and any other spills in a liquid environment such as large bodies of water (oceans, lakes, rivers and more). When starting as a failure or accident, a spill may be substantially concentrated and may span a limited area. If contained at this stage, it may be possible to prevent the spill from: becoming separated, spread by waves and currents and physically and/or chemically transformed or altered. For example, some embodiments of this invention could be used as primary means for blocking an oil spill.

Known solutions include transporting pre-manufactured containment booms to the site of the spill and deploying them to mechanically block it. Some embodiments of the current invention introduce a method for manufacturing and deploying booms on-site. Furthermore, some embodiments of the invention include a novel boom (floating barrier) production concept and design which may enable improved containment with smaller and lighter boom size, which allows the boom to be stored on typical marine vessels. This method avoids the necessity to tow the boom while transferring it to the spill location.

Removing the need to tow the boom enables its extremely light design, compared to any other type of boom. The concept and design also prevents types of failure typical to current booms like submergence, entrainment and planning.

Some embodiments of this invention could also be used to contain floating areas of flora or fauna or any floating material, for different reasons. This method enables this floating "colony" to move in-sync with sea currents and keeping relatively isolated from its surrounding. Other embodiments of this invention can be used to prevent floating flora or fauna from entering into area isolated by this method.

Some novel aspects of the invention and the advantages yielded from them are:

1. According to some embodiments, this boom is made available immediately as an event occurs. The boom materials and the apparatus which deploys the boom (the spill containment system) are designed to be installed on a vessel. The vessel can be manned or unmanned. The vessel can be specifically designated for the purpose of the spill containment system, or the spill containment system can be installed on other vessels such as coast guard boats, vessels of opportunity or general purpose boats. The vessel containing the system can be stored on another ship (like a tanker or other merchant ship), on oil rigs, at a port, or it can be stored at any location and arrive at spill site by self-proportion or carried to the oil spill site via another vessel or aircraft.
2. According to some embodiments, the booms may be manufactured on-site, which may enable creation of significant boom lengths or variety of types to be created without requiring extensive storage space.
3. According to some embodiments, the boom's production concept may be based on inflating air (or any suitable gas) and filling liquid (which may be sea water, filtered water, drinking water, the spilled substance such as oil or any other suitable liquid) in a coordinated sequential or simultaneous process into a rolled or folded plastic sleeve. It is also possible to fill the boom chambers with closed cell and open cell foam to function as a float or ballast for some or all parts of the boom. This process can be done manually or using an apparatus, with or without human intervention.
4. According to some embodiments, the boom roll or package is pre-manufactured using multi-layer foils which may be welded or attached together to create an internal structure and separation of chambers. Some elements of the structure may enable/support the creation of the boom by enabling inflating of the boom or filling it with water or other materials, either manually or through automatic processes.
5. According to some embodiments, the boom may be built of separate closed chambers configured to contain air or filled with closed cell foam to function as a float and water or close or open cell foam to function as ballast. In case of a local damage (i.e. deflating of one or few chambers). A continuous wall ("skirt") may enable the boom to continue and function as a barrier.
6. According to some embodiments, the internal structure of the boom's separated closed chambers, may contribute in making them flexible and stable at the desired axis and directions. The design of the boom may enable it to meet hydrodynamic needs to create stability or flexibility at the required areas.
7. According to some embodiments, the boom may be designed to enable it to function as a part of the body of water. For example the boom stability may substantially not be affected by underwater currents so that the boom is not dragged in different directions than the body of water, in other cases underwater currents are themselves sometimes a local part of the body of water.
8. According to some embodiments, the boom may be designed so that there is a substantially constant stabilization process which keeps it balanced substantially at all times on the vertical axis.
9. According to some embodiments, the boom may further be designed or configured so that the boom may move with the water surface in different water conditions such that the oil/spill will substantially not be able to pass over or under the boom. Joining boom parts and creating a continuous boom is done by binding together different parts or edges of the boom, with or without external materials.

10. According to some embodiments, depending on the spill size/amount, and the situation scenario, the spill contained within the boom's borders can be treated immediately by a crew, tools and materials from the boom producing vessel, neighboring vessels, aircrafts etc. Furthermore if not treated immediately the spill will remain substantially contained within the boom and may float with the currents and be treated later.

11. According to some embodiments, the system may contain an additional sub system (installed on the vessel or produced with the boom) for treating the oil. For example the subsystem may be an oil separator (skimmer) that mechanically separates the oil from the water. In another embodiment the additional sub system may include a mechanism to release a chemical or biological agent that interacts with the oil (as a part of the boom or attached to it before, during or after its deployment).

12. According to some embodiments, an additional sub system may gather the oil in an expandable chamber made out of flexible material. Thus the collected oil receptacle can be also stored in a small space and then expand to store the oil. This expandable container can float and may include its own beacon so it could be left at sea to be collected later.

13. According to some embodiments, the boom can be used either to contain oil spills, i.e. enclosing the spill within the boom perimeter. Conversely, in certain situations, it is possible to use this method and materials to enclose non spill area in order to prevent chemicals from reaching the parts enclosed by the boom. For example—to protect animals from external risk, or to protect parts of shore.

14. According to some embodiments, the location of the spill can be transmitted by beacons attached to the boom and equipped with visual or radio transmitters activated by sea water, batteries or other sources of energy. This transmitter may enable tracking of the contained spill by ships, aircrafts, or satellites. After being detected, the spill can be treated by response units as described above.

15. According to some embodiments an additional subsystem may be used to collect the boom after it is deployed and prepare it for disposal in a useful manner. This sub-system may be installed on the same vessel that deployed the boom or on another vessel. It may comprise of a mechanical system that pulls the boom, cuts the cells, passes the water to along with any residue on the boom to treatment, shreds/folds/cuts the boom and stores it in containers to be treated later.

Exemplary Embodiments of the Process

According to some embodiments, a method of blocking marine oil or chemical spills or any other liquid containing hazard is disclosed. The method may utilize a dedicated apparatus which may be installed on board of a conventional (manned) or a specially designated unmanned vessel. The vessel itself may be positioned in ports, beaches, on-board of any type of ship, aircraft or oil rig. The apparatus has the ability to produce and deploy a boom while the vessel is tracking the spill border lines and may create a barrier located substantially at the relevant position for containment of the spill. This tracking can be done manually (steering the vessel) or automatically.

In case of using unmanned (robotic) vessel it may be equipped with a system that includes sensors, software and steering or operated by remote control. The tracking may be done, for example, by identifying contrast lines between the spill and the sea background. Contrast lines may be defined by: color, reflection, density or other material's attributes using variety of passive or active types of sensors or a combination of attributes and more.

According to some embodiments, the vessel may be activated automatically or mechanically. The activation process can contain a launching mechanism, using a spring, a blast or other means to push it, fire it or throw it into the water. It can be pushed into the water using gravity, winch, elevator, crane or other means.

According to some embodiments, the apparatus may be designed so that long barriers may be created while using relatively small space on board the vessel carrying it. The manufacturing process may be followed by a deployment process in which the boom is applied into the water at the desired location.

According to some embodiments, the deployment process may be coordinated with the vessel speed. Contact point of the sleeve and the sea might involve using of a funnel to take place beyond the vessel's rudder and propeller in a way that the boom and the vessel's functions are not damaged.

According to some embodiments, the material used to create the booms may be chemically engineered to be recyclable or compostable so it does not create an ecological damage in itself. It can have either oleophilic or oleophobic coating. It can also be chemically engineered to be fire resistant so in certain conditions the spill can be burned in place ("in-situ burning"). Its surface color may be made of high visibility and contrast color or colors to be seen from afar.

According to some embodiments, the basic design of the boom's roll or package may be pre-fabricated to the desired structure, and then rolled or folded to fit the structure of the apparatus. The "ready to be inflated" boom package may be made mainly of the multilayer material itself and may include other materials if necessary for hinge or pivot. There is an option to use different materials to function as ballast or to have extra tensile strength, stability, flexibility or elasticity of the boom. These materials can be inserted before or after the boom is inflated and filled.

According to some embodiments, On board of the vessel there may be extra reels or packages ready for additional booms production. These reels or packages might be of same or different shape, material, size or length for different scenarios of spills (i.e. different sea conditions, type of oil or other chemical, size or treatment of spill). The replacement process can be done manually or automatically. There might be a device to assist the replacement and or joining the edges of one boom to the other.

According to some embodiments, In addition to its containment function, the vessel or the airplane carrying the apparatus might carry a certain amount of dispersants or other spill-treating agents to take care of small to medium marine oil spills at their initial stages. This ability helps, in some occasions, to terminate the spill and withhold the necessity of sending more vessels or airplanes. Spill treating materials are considered to be more effective when applied at earlier stages.

According to some embodiments, after the spill is taken care of by different means, it may be considered relatively easy to collect and store the used booms. The collecting process can be manual, using a winch or other devices which have the ability to deflate the boom air and water chambers (cut it in a way the air is deflated and water is drained). This process reduces the boom volume to substantially its original dimensions so it can be stored occupying a minimal space.

Exemplary Embodiments of the Boom Design:

In some previous solutions, it was necessary to tow the boom with a vessel in a direction dictated by the vessel and not by the body of water. Because of the need to tow the boom, it had to withstand forces that could potentially damage the boom. Keeping the skirt vertical at previous booms was done using heavy weight ballast. This enforcement led to the bulky and massive structure of current booms.

The new boom is designed to achieve the following advantages compared to some of the previous solutions:

- According to some embodiments, the boom is created by "packaging" air and water in a special structure to create a boom.
- According to some embodiments, there is a reduced need to use heavy ballasts. The design concept is based on the boom's float being substantially off-centered. Forces applied to unbalance the boom are reacted by contradicting floating forces that keep the underwater wall ("skirt") perpendicular and rebalance the boom. This continuous process enables the boom to function as a barrier. This ability is achieved by the two parts (float and skirt) having rigid structure at the roll axis which keeps the skirt perpendicular to the float at any situation.
- According to some embodiments, the boom's float may be configured or designed as a proportionally low and flat shape above the sea surface to reduce wind effect and lift force. The advantage of the boom substantially behaving as part of the body of water surrounding it dictates a minimal signature bulge above sea surface. It should be minimally affected by the wind. At the same time it should function as a barrier and block the spill from moving to the other side. The float is designed to create minimal lift forces (i.e. minimal aerodynamic shape). This ability is achieved by creating above water shape with minimal streaming lines while maintaining a maximal drag factor. It might involve sharp corners, concaved profile, rough surface and rigid structure partly sunken in the water to prevent the edges from folding up.
- According to some embodiments, a "T" shaped boom may have an improved roll response which may be achieved by moving the float away from the centerline.
- According to some embodiments, it is advantageous for the lower part of the boom, the skirt, to be a little heavier than the body of water, in order to keep the floating part's edges in the water. This could be achieved by lifting the column of water into the area of the float. Specifically creating a boom structure such that areas filled with water are held above the water level will create extra weight. Using water as an external weight to function as ballast.
- According to some embodiments, the boom material and chambers, may be planned and pre-manufactured in a way that the float chambers are arranged at substantially lateral lines (similar to a package of sausages) or a combination of other lines. These chambers may be built to create a rigid horizontal wall. The apparatus may pump water into the water chambers to create a rigid vertical wall. These two chambers_types (air filled and water filled) may be robust enough to remain perpendicular to each other. This may achieve both superior roll behavior as well as preventing a skirt from folding. Rigidity may be achieved also by using straps made of the boom's material and creates a beam structure. Additional chamber types may achieve the same results such as gas filled, liquid filled and more.
- According to some embodiments better behavior in wavy sea may be achieved. The boom may be designed so that the boom may be coordinated with waves and heave with substantially full synchronization with the body of water. This may apply to both axes: roll and pitch to improve the containment capabilities.
- According to some embodiments, longitude flexibility, which may result in an improved heaving, may be achieved by some or all of the following factors: a proportionally short skirt, proportionally short chambers length, the material flexibility, extra foil material between the cells (which may be left/introduced by/during the inflating process), minimal additional ballast weight.
- According to some embodiments, the boom which has a three-dimensional shape (for example a T shape), is made of two flat sleeves. One component is filled with water and includes the skirt and the part which functions as above-water ballast. The other two-dimensional sleeve is filled with air and functions as a float. These 2 sleeves are pre-manufactured as two dimensional (flat) sleeves and are threaded one in the other before or during the filling or inflating process.
- Rigidness can be created by filling the sleeves with water and inflating with air. Filling the chamber with water and air can also enable the forces that hold the structure together.

It is expected that during the life of a patent maturing from this application many relevant spill booms will be developed and the scope of the term "boom" is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for blocking the spread of a spill of floating substances spilled into water, comprising:
    arranging a plurality of segments to define a spill-blocking boom having a longitudinal axis, each of said segments defining a plurality of preformed compartments including a floatation element and a ballast compartment, wherein each said floatation element has a longitudinal axis in a cross-sectional plane perpendicular to said boom longitudinal axis and each said ballast compartment has a longitudinal axis in a cross-sectional plane perpendicular to said boom longitudinal axis;
    storing the boom having said plurality of preformed compartments in a compressed format in a stored configuration;
    utilizing a deployment craft to navigate around the spill while simultaneously deploying the spill-blocking boom such that said boom surrounds the spill, said boom deployed around the spill while the craft is navigated around the spill, wherein upon deployment mutual forces are exerted between a said floatation element and at least one portion of said boom outside said floatation element, wherein said mutual forces set and maintain a said floatation element longitudinal axis at an angle of less than 180 degrees to at least one of:
        another said floatation element longitudinal axis; and
        a said ballast compartment longitudinal axis;
    releasing said boom from said deployment craft to allow it to float freely with the spill, unattached to anything.

2. The method according to claim 1, wherein said deploying comprises deploying a boom at least 200 meters long within 15 minutes of detecting the spill.

3. The method according to claim 1, wherein said deploying begins within 5-20 minutes of detecting the spill.

4. The method according to claim 1, wherein said releasing comprises encircling and entirely containing the spill within 30 minutes from detecting the spill.

5. The method according to claim 1, wherein said boom includes at least one hollow section, wherein said deploying comprises allowing at least a portion of said at least one hollow section to be filled with ambient water, stabilizing the boom.

6. The method according to claim 1, wherein said boom, when deployed, behaves as part of the body of water surrounding it.

7. The method according to claim 1, comprising dispensing an oil-absorbing layer along with said boom.

8. The method according to claim 1, wherein said deploying is performed by no more than two operators working on said deployment craft.

9. The method according to claim 1, wherein said boom includes a navigational aid, said method further comprising locating said boom and contained spill after said boom has drifted using said navigational aid.

10. The method according to claim 1, wherein said preformed compartments are stored in said compressed format on one of a plurality of reels stored on said deployment craft, said method further including selecting said boom out of said plurality of reels, said selecting performed according to one or more of: spill material, spill size, temperature, wind conditions, wave conditions, water conditions.

11. A boom sleeve for blocking spread of a spill of floating substances spilled into water, said boom sleeve comprising:
    a plurality of segments arranged to define an elongate structure having a boom longitudinal axis, each of said segments comprising a plurality of preformed compartments including a floatation element and a ballast compartment, wherein each said floatation element has a longitudinal axis in a cross-sectional plane perpendicular to said boom longitudinal axis and each said ballast compartment has a longitudinal axis in a cross-sectional plane perpendicular to said boom longitudinal axis;
    said boom sleeve configured to form a continuous barrier that surrounds said spill and which barrier floats freely when deployed, unattached to anything;
    wherein said boom-sleeve is stored in a compressed format in a stored configuration, said boom-sleeve stored one of:
        at a long term storage facility;
        at or near a potential spill site; and
        on a deployment craft;
    wherein upon deployment mutual forces are exerted between said floatation element and at least one portion of said boom sleeve outside said floatation element, wherein said mutual forces set and maintain a said floatation element longitudinal axis at an angle of less than 180 degrees to at least one of:
        another said floatation element longitudinal axis; and
        a said ballast compartment longitudinal axis.

12. The method according to claim 1, wherein said geometrical relationship between said floatation element and said at least one portion of said boom outside said floatation element is a locked geometrical relationship.

13. The method according to claim 1, wherein said geometrical relationship between said floatation element and said at least one portion of said boom outside said floatation element is a fixed geometrical relationship.

14. The method according to claim 1, wherein said geometrical relationship between said floatation element and said at least one portion of said boom outside said floatation element is a geometrical positional relationship.

15. The method according to claim 1, wherein upon deployment mutual forces are exerted between said floatation element and at least an outer surface of said one portion of said boom outside said floatation element.

16. The method according to claim 1, wherein upon deployment the mutual forces are exerted adjacent an attachment point between said floatation element and said at least one portion of said boom outside said floatation element.

17. The method according to claim 1, wherein upon deployment each of a plurality of said floatation elements is positioned at a same height and at a same axial location along said boom longitudinal axis as another respective said floatation element, wherein said mutual forces set and maintain each said floatation element of said plurality of floatation elements at said same height and at said same axial location along said boom longitudinal axis as said another respective said floatation element.

18. The method according to claim 1, wherein upon deployment a plurality of said floatation elements is each arranged at a respective axial location along said boom longitudinal axis with its respective longitudinal axis having a horizontal orientation, each of said plurality of floatation elements having a corresponding floatation element with its respective longitudinal axis having a horizontal orientation and being at a same respective axial location along said boom longitudinal axis, wherein said mutual forces set and maintain each floatation element longitudinal axis of said plurality of said floatation elements in said horizontal orientation and set and maintain each of said corresponding floatation elements at said same axial location along said boom longitudinal axis as said respective floatation element.

19. A method according to claim 1, wherein said ballast compartment is fillable with water.

20. A boom sleeve for blocking spread of a spill of floating substances spilled into water, said boom sleeve comprising:
a plurality of segments arranged to define an elongate structure having a boom longitudinal axis, each of said segments comprising a floatation element and a ballast compartment, wherein each said floatation element has a longitudinal axis in a cross-sectional plane perpendicular to said boom longitudinal axis and each said ballast compartment has a longitudinal axis in a cross-sectional plane perpendicular to said boom longitudinal axis, and wherein upon deployment mutual forces are exerted between said floatation element and at least one portion of said boom sleeve outside said floatation element, wherein said mutual forces set and maintain a said floatation element longitudinal axis at an angle of less than 180 degrees to said at least one of:
another said floatation element longitudinal axis; and
a said ballast compartment longitudinal axis;
said boom sleeve configured to form a continuous barrier that surrounds said spill and floats freely when deployed, unattached to anything.

21. The boom sleeve according to claim 20, said boom sleeve further including one or more navigational aids.

22. The boom sleeve according to claim 21, wherein said one or more navigational aids is a beacon or transmitter.

23. The boom sleeve according to claim 20, wherein said boom sleeve is shaped and sized to be stored in a compressed format on a deployment craft which is at most 10 meters length.

24. The boom sleeve according to claim 20, wherein a cross-sectional profile of a said flotation element has a width at least 1.5 times greater than its height.

25. The boom sleeve according to claim 20, wherein said boom sleeve is configured to form a ring around said spill which drifts along with said spill.

26. The boom sleeve according to claim 20, comprising color indications for estimating a length of said boom sleeve and/or a circumference of said spill.

27. The boom sleeve according to claim 20, wherein said ballast compartment comprises a compressed sponge suitable for absorbing water.

28. The boom sleeve according to claim 20, wherein said floatation element and said ballast compartment are perpendicular to each other.

29. The boom sleeve according to claim 20, wherein a said floatation element and a said ballast compartment are configured to have a cross-shape.

* * * * *